(12) United States Patent
Khan et al.

(10) Patent No.: US 12,710,547 B2
(45) Date of Patent: Aug. 18, 2026

(54) GLOBAL NAVIGATION SATELLITE SYSTEM DATA VALIDITY IN NON-TERRESTRIAL NETWORKS

(71) Applicant: Telefonaktiebolaget LM Ericsson (PUBL), Stockholm (SE)

(72) Inventors: Talha Khan, Santa Clara, CA (US); Xingqin Lin, San Josè, CA (US); Zhipeng Lin, Nanjing Jiangsu (CN); Johan Rune, Lidingö (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 381 days.

(21) Appl. No.: 18/294,214

(22) PCT Filed: Aug. 5, 2022

(86) PCT No.: PCT/SE2022/050738
§ 371 (c)(1),
(2) Date: Feb. 1, 2024

(87) PCT Pub. No.: WO2023/014271
PCT Pub. Date: Feb. 9, 2023

(65) Prior Publication Data

US 2026/0153630 A1 Jun. 4, 2026

Related U.S. Application Data

(60) Provisional application No. 63/229,643, filed on Aug. 5, 2021.

(51) Int. Cl.
*G01S 19/08* (2010.01)
*G01S 19/12* (2010.01)

(52) U.S. Cl.
CPC .............. *G01S 19/08* (2013.01); *G01S 19/12* (2013.01)

(58) Field of Classification Search
CPC ... G01S 19/08; G01S 19/12; H04W 4/02–029
See application file for complete search history.

(56) References Cited

U.S. PATENT DOCUMENTS

2010/0141470 A1* 6/2010 Rowitch ............... G01S 19/258 340/8.1
2020/0053690 A1* 2/2020 Fischer ................... G01S 19/05
(Continued)

FOREIGN PATENT DOCUMENTS

WO WO2020162806 A2 8/2020
WO WO-2021066696 A1 * 4/2021 ......... H04B 7/18504
(Continued)

OTHER PUBLICATIONS

3GPP TR 38.821 V16.1.0 (May 2021); 3rd Generation Partnership Project; Technical Specification Group Radio Access Network; Solutions for NR to support non-terrestrial networks (NTN) (Release 16).

(Continued)

*Primary Examiner* — Cassi J Galt
(74) *Attorney, Agent, or Firm* — Baker Botts L.L.P.

(57) ABSTRACT

A method (900) by a user equipment, UE, (112) for determining the validity of Global navigation satellite system, GNSS, data, includes maintaining (902) at least one validity timer for determining whether the GNSS data is valid or not valid.

18 Claims, 10 Drawing Sheets

(56) References Cited

U.S. PATENT DOCUMENTS

2023/0134701 A1* 5/2023 Åström ................. G01S 19/254
342/357.64
2024/0340074 A1* 10/2024 Yan ................... H04W 56/0005

FOREIGN PATENT DOCUMENTS

WO WO2021133239 A1 7/2021
WO WO2021183328 A1 9/2021
WO WO2022084958 A1 4/2022

OTHER PUBLICATIONS

3GPP TR 36.763 V17.0.0 (Jun. 2021); 3rd Generation Partnership Project; Technical Specification Group Radio Access Network; Study on Narrow-Band Internet of Things (NB-IoT) / enhanced Machine Type Communication (eMTC) support for Non-Terrestrial Networks (NTN) (Release 17).

3GPP TR 38.811 V15.4.0 (Sep. 2020); 3rd Generation Partnership Project; Technical Specification Group Radio Access Network; Study on New Radio (NR) to support non-terrestrial networks (Release 15).

3GPP TSG RAN WG1 Meeting #105-e; e-Meeting, May 10-27, 2021; Agenda Item: 8.15.2; Source: Moderator (MediaTek); Title: Summary #4 of AI 8.15.2 Enhancements to time and frequency synchronization; Document for: Discussion and Decision (R1-2106289).

3GPP TSG RAN meeting #86; Sitges, Spain, Dec. 9-13, 2019; Source: Thales; Title: Solutions for NR to support non-terrestrial networks (NTN); Type: WID new; Document for: Approval; Agenda Item: 9.1.2—Proposals led by RAN2; Release Rel-17 (RP-193234 (revision from RP-192502, 3144)).

3GPP TSG RAN Meeting #86; Sitges, Spain, Dec. 9-31, 2019; Source: MediaTek Inc.; Title: New Study WID on NB-IoT/eTMC support for NTN (RP-193235).

3GPP TSG RAN Meeting #90; Electronic Meeting, Dec. 7-11, 2020; Source: MediaTek Inc.; Title: New Study WID on NB-IoT/eTMC support for NTN (RP-202689 (revision of RP-193235)).

3GPP TSG RAN Meeting #92-e; Electronic Meeting, Jun. 14-18, 2021; Source: MediaTek Inc., Eutelsat S.A.; Title: WID on NB-IoT/eMTC support for NTN; Agenda Item: 10.5.1 (RP-211601 (was RP-211573)).

PCT International Search Report issued for International application No. PCT/SE2022/050738—Oct. 28, 2022.

PCT Written Opinion of the International Searching Authority issued for International application No. PCT/SE2022/050738—Oct. 28, 2022.

* cited by examiner

900
Start
902
Maintain at least one validity timer for determining whether the GNSS data is valid or not valid
End 1000
Start
1002
During connection reestablishment, receive, from a UE, first information about a validity duration of the GNSS data and/or a time-to-first-fix
1004
Based on the information, perform at least one action
End

GLOBAL NAVIGATION SATELLITE SYSTEM DATA VALIDITY IN NON-TERRESTRIAL NETWORKS

PRIORITY

This nonprovisional application is a U.S. National Stage Filing under 35 U.S.C. § 371 of International Patent Application Serial No. PCT/SE2022/050738 filed Aug. 5, 2022 and entitled "GLOBAL NAVIGATION SATELLITE SYSTEM DATA VALIDITY IN NON-TERRESTRIAL NETWORKS" which claims priority to U.S. Provisional Patent Application No. 63/229,643 filed Aug. 5, 2021, both of which are hereby incorporated by reference in their entirety.

TECHNICAL FIELD

The present disclosure relates, in general, to wireless communications and, more particularly, systems and methods for Global Navigation Satellite System (GNSS) data validity in Non-Terrestrial Networks (NTNs).

BACKGROUND

In $3^{rd}$ Generation Partnership Project (3GPP) Release 8, the Evolved Packet System (EPS) was specified. EPS is based on the Long-Term Evolution (LTE) radio network and the Evolved Packet Core (EPC). It was originally intended to provide voice and mobile broadband (MBB) services but has continuously evolved to broaden its functionality. Since 3GPP Release 13, Narrowband-Internet of Things (NB-IoT) and LTE-Machine Type Communication (LTE-M) are part of the LTE specifications and provide connectivity to massive machine type communications (mMTC) services.

In 3GPP Release 15, the first release of the 5G system (5GS) was specified. This is a new generation's radio access technology intended to serve use cases such as enhanced mobile broadband (eMBB), ultra-reliable and low latency communication (URLLC) and mMTC. $5^{th}$ Generation (5G) includes the New Radio (NR) access stratum interface and the 5G Core Network (5GC). The NR physical and higher layers are reusing parts of the LTE specification, and to that add needed components when motivated by the new use cases. One such component is the introduction of a sophisticated framework for beam forming and beam management to extend the support of the 3GPP technologies to a frequency range going beyond 6 GHz.

There is an ongoing resurgence of satellite communications. Several plans for satellite networks have been announced in the past few years. The target services vary, from backhaul and fixed wireless, to transportation, to outdoor mobile, to Internet of Things (IoT). Satellite networks could complement mobile networks on the ground by providing connectivity to underserved areas and multicast/broadcast services.

To benefit from the strong mobile ecosystem and economy of scale, adapting the terrestrial wireless access technologies including LTE and NR for satellite networks is drawing significant interest, which has been reflected in the 3GPP standardization work. In 3GPP Release 15, 3GPP started the work to prepare NR for operation in a Non-Terrestrial Network (NTN). The work was performed within the study item "NR to support Non-Terrestrial Networks" and resulted in 3GPP TR 38.811. In 3GPP Release 16, the work to prepare NR for operation in an NTN network continued with the study item "Solutions for NR to support Non-Terrestrial Network", which has been captured in 3GPP TR 38.821. In parallel, the interest to adapt NB-IoT and LTE-M for operation in NTN is growing. As a consequence, 3GPP Release 17 contains both a work item on NR NTN and a study item on NB-IoT and LTE-M support for NTN. See, RP-193234, *Solutions for NR to support non-terrestrial networks* (*NTN*), 3GPP RAN #86. See also, RP-193235, *Study on NB-Io/eMTC support for Non-Terrestrial Network,* 3GPP RAN #86.

A satellite radio access network usually includes the following components:

A satellite that refers to a space-borne platform.

An earth-based gateway that connects the satellite to a base station or a core network, depending on the choice of architecture.

Feeder link that refers to the link between a gateway and a satellite

Access link, or service link, that refers to the link between a satellite and a UE.

Depending on the orbit altitude, a satellite may be categorized as low earth orbit (LEO), medium earth orbit (MEO), or geostationary earth orbit (GEO) satellite.

LEO: typical heights ranging from 250-1,500 km, with orbital periods ranging from 90-120 minutes.

MEO: typical heights ranging from 5,000-25,000 km, with orbital periods ranging from 3-15 hours.

GEO: height at about 35,786 km, with an orbital period of 24 hours.

Two basic architectures can be distinguished for satellite communication networks, depending on the functionality of the satellites in the system:

Transparent payload (also referred to as bent pipe architecture). The satellite forwards the received signal between the terminal and the network equipment on the ground with only amplification and a shift from uplink (UL) frequency to downlink (DL) frequency. When applied to general 3GPP architecture and terminology, the transparent payload architecture means that the gNodeB (gNB) is located on the ground and the satellite forwards signals/data between the gNB and the UE Regenerative payload. The satellite includes on-board processing to demodulate and decode the received signal and regenerate the signal before sending it back to the earth. When applied to general 3GPP architecture and terminology, the regenerative payload architecture means that the gNB is located in the satellite.

In the work item for NR NTN in 3GPP Release 17, only the transparent payload architecture is considered.

FIG. 1 illustrates an example architecture of a satellite network with bent pipe transponders (i.e. the transparent payload architecture). The gNB may be integrated in the gateway or connected to the gateway via a terrestrial connection (wire, optic fiber, wireless link).

A communication satellite typically generates several beams over a given area. The footprint of a beam is usually in an elliptic shape, which has traditionally been considered as a cell, but cells consisting of the coverage footprint of multiple beams are not excluded in the 3GPP work. The footprint of a beam is also often referred to as a spotbeam. The footprint of a beam may move over the earth's surface with the satellite movement or may be earth fixed with a beam pointing mechanism used by the satellite to compensate for the satellite's motion. The size of a spotbeam depends on the system design, which may range from tens of kilometers to a few thousands of kilometers.

Propagation delay is an important aspect of satellite communications that is different from the delay expected in a terrestrial mobile system. For a bent pipe satellite network, the round-trip delay may, depending on the orbit height, range from tens of milliseconds (ms) in the case of LEO satellites to several hundreds of ms for GEO satellites. As a comparison, the round-trip delays in terrestrial cellular networks are typically below 1 ms.

The distance between the user equipment (UE) and a satellite can vary significantly, depending on the position of the satellite and, thus, the elevation angle F seen by the UE. Assuming circular orbits, the minimum distance is realized when the satellite is directly above the UE (ε=90°), and the maximum distance when the satellite is at the smallest possible elevation angle. Table 1 shows the distances between satellite and UE for different orbital heights and elevation angles together with the one-way propagation delay and the maximum propagation delay difference (the difference from the propagation delay at ε=90°). Note that this table assumes regenerative payload architecture. For the transparent payload case, the propagation delay between gateway and satellite needs to be considered as well, unless the base station corrects for that.

TABLE 1

Propagation delay for different orbital heights and elevation angles.

| Orbital height | Elevation angle | Distance UE <—> satellite | One-way propagation delay | Propagation delay difference |
|---|---|---|---|---|
| 600 km | 90° | 600 km | 2.0 ms | — |
| | 30° | 1075 km | 3.6 ms | 1.6 ms |
| | 10° | 1932 km | 6.4 ms | 4.4 ms |
| 1200 km | 90° | 1200 km | 4.0 ms | — |
| | 30° | 1999 km | 6.7 ms | 2.7 ms |
| | 10° | 3131 km | 10.4 ms | 6.4 ms |
| 35786 km | 90° | 35786 km | 119.4 ms | — |
| | 30° | 38609 km | 128.8 ms | 9.4 ms |
| | 10° | 40581 km | 135.4 ms | 16.0 ms |

The propagation delay may also be highly variable due to the high velocity of the LEO and MEO satellites and change in the order of 10-100 μs every second, depending on the orbit altitude and satellite velocity.

For NTNs using 3GPP technology, in particular 5G/NR, the long propagation delay means that the timing advance (TA) the UE uses for its UL transmissions is essential and has to be much greater than in terrestrial networks in order for the UL and DL to be time aligned at the gNB, as is the case in NR and LTE. One of the purposes of the random access (RA) procedure is to provide the UE with a valid TA (that the network later can adjust based on the reception timing of UL transmission from the UE). However, even the random access preamble, which is included in the initial message from the UE in the random access procedure, has to be transmitted with a TA to allow a reasonable size of the RA preamble reception window in the gNB (and to ensure that the cyclic shift of the preamble's Zadoff-Chu sequence cannot be so large that it makes the Zadoff-Chu sequence and, thus, the preamble appear as another Zadoff Chu sequence and, thus, another preamble based on the same Zadoff-Chu root sequence), but this TA does not have to be as accurate as the TA the UE subsequently uses for other UL transmissions. The TA the UE uses for the RA preamble transmission in NTN is called pre-compensation TA. Various proposals are considered for how to determine the pre-compensation TA, all of which involve information originating both at the gNB and at the UE. In brief, the discussed alternative proposals include:

Broadcast of a "common TA" which is valid at a certain reference point, e.g. a center point in the cell. The UE would then calculate how its own pre-compensation TA deviates from the common TA based on the difference between the UE's own location and the reference point together with the position of the satellite. In this approach, the UE acquires its own position using Global Navigation Satellite System (GNSS) measurements and the UE obtains the satellite position using satellite orbital data (including satellite position at a certain time) broadcast by the network.

The UE autonomously calculates the propagation delay between the UE and the satellite based on the UE's and the satellite's respective positions, and the network/gNB broadcasts the propagation delay on the feeder link. This propagation delay is the propagation delay between the gNB and the satellite. In this approach, the UE acquires its own position using GNSS measurements, and the UE obtains the satellite position using satellite orbital data (including satellite position at a certain time) broadcast by the network. The pre-compensation TA is then twice the sum of the propagation delay on the feeder link and the propagation delay between the satellite and the UE.

The gNB broadcasts a timestamp (in SIB9), which the UE compares with a reference timestamp acquired from GNSS. Based on the difference between these two timestamps, the UE can calculate the propagation delay between the gNB and the UE, and the pre-compensation TA is twice as long as this propagation delay.

In conjunction with the RA procedure, the gNB provides the UE with an accurate (i.e. fine-adjusted) TA in the Random Access Response (RAR) message (in 4-step RA) or MsgB (in 2-step RA), based on the time of reception of the random access preamble. The gNB can subsequently adjust the UE's TA using a Timing Advance Command MAC CE (or an Absolute Timing Advance Command MAC CE), based on the timing of receptions of UL transmissions from the UE. A goal with such network control of the UE's TA is typically to keep the time error of the UE's UL transmissions at the gNB's receiver within the cyclic prefix (which is required for correct decoding of the UL transmissions). The TA control framework also includes a time alignment timer that the gNB configures the UE with. The time alignment timer is restarted every time the gNB adjusts the UE's TA and if the time alignment timer expires, the UE is not allowed to transmit in the UL without a prior RA procedure (which serves the purpose to provide the UE with a valid TA). For NTN, 3GPP has also agreed that in addition to the gNB's control of the UE's TA, the UE is allowed to autonomously update its TA based on estimation of changes in the UE-gNB Round-Trip-Time (RTT) using the UE's location (e.g. obtained from GNSS measurement) and knowledge of the serving satellite's ephemeris data and feeder link delay information from the gNB.

A second relevant aspect is that not only is the propagation delay between the UE and a satellite, or between the UE and a gNB, very long in NTN, but the due to the large distances, the difference in propagation delay to two different satellites, or two different gNBs, may be significant on the timescales relevant for cellular communication, including signaling procedures, even when the satellites/gNBs serve neighboring cells. This has an impact on all procedures involving reception or transmission in two cells served by different satellites and/or different gNBs.

A third important aspect related to the long propagation delay/RTT in Non-Terrestrial Networks is the introduction of an additional parameter to compensate for the long propagation delay/RTT. In terrestrial cellular networks, the UE-gNB RTT may range from more or less zero to several tens of microseconds in a cell. A major difference in NTNs, apart from the sheer size of the propagation delay/RTT, is that even at the location in the cell where the propagation delay/RTT is the smallest, it will be large and nowhere close to zero. In fact, the variation of the propagation delay/RTT within a NTN cell is small compared to the propagation delay/RTT. This speaks in favor of introducing an offset which essentially takes care of the RTT between the cell's footprint on the ground and the satellite, while other mechanisms, including signaling and control loops, take care of the RTT dependent aspects within the smaller range of RTT variation within the cell on top of the offset. To this end, 3GPP has agreed to introduce such a parameter, which is denoted $K_{offset}$ (or sometimes K_offset).

The $K_{offset}$ parameter may potentially be used in various timing related mechanisms, but the main focus is to use it in the scheduling of UL transmissions on the Physical Uplink Shared Channel (PUSCH). $K_{offset}$ is used to indicate an additional delay between the UL grant and the PUSCH transmission resources allocated by UL grant to be added to the slot offset parameter $K_2$ in the Downlink Control Information (DCI) containing the UL grant. The offset between the UL grant and the slot in which the PUSCH transmission resources are allocated is thus $K_{offset}+K_2$. When used this way in UL scheduling, $K_{offset}$ can be said to serve the purpose to ensure that the UE is never scheduled to transmit at a point in time that due to the large TA the UE has to apply would occur before the point in time when the UE receives the UL grant. In 3GPP, it is also discussed to let the network's configuration of $K_{offset}$ take into account the TA the UE may have signaled that the UE has used.

A fourth important aspect closely related to the timing is a Doppler frequency offset induced by the motion of the satellite. The access link may be exposed to Doppler shift in the order of 10-100 kHz in sub-6 GHz frequency band and proportionally higher in higher frequency bands. Also, the Doppler shift is varying, with a rate of up to several hundred Hz per second in the S-band and several kHz per second in the Ka-band.

In 3GPP TR 38.821, it has been captured that ephemeris data should be provided to the UE, for example to assist with pointing a directional antenna (or an antenna beam) towards the satellite, and to calculate a correct TA and Doppler shift. Procedures on how to provide and update ephemeris data have not yet been studied in detail, though, but broadcasting of ephemeris data in the system information is one option.

A satellite orbit can be fully described using six parameters. Exactly which set of parameters is chosen can be decided by the user; many different representations are possible. For example, a choice of parameters used often in astronomy is the set (a, ε, i, Ω, ω, t). Here, the semi-major axis a and the eccentricity e describe the shape and size of the orbit ellipse; the inclination i, the right ascension of the ascending node Ω, and the argument of periapsis ω determine its position in space, and the epoch t determines a reference time (e.g. the time when the satellites moves through periapsis). FIG. 2 illustrates orbital elements that include a set of parameters.

As an example of a different parametrization, the Two-Line Elements (TLEs) use mean motion n and mean anomaly M instead of a and t. A completely different set of parameters is the position and velocity vector $(x, y, z, v_x, v_y, v_z)$ of a satellite. These are sometimes called orbital state vectors. They can be derived from the orbital elements and vice versa, since the information they contain is equivalent. All these formulations (and many others) are possible choices for the format of ephemeris data to be used in NTN. To enable further progress, the format of the data should be agreed upon.

It is important that a UE can determine the position of a satellite with accuracy of at least a few meters. However, several studies have shown that this might be hard to achieve when using the de-facto standard of TLEs. On the other hand, LEO satellites often have GNSS receivers and can determine their position with some meter level accuracy.

Another aspect discussed during the study item and captured in 3GPP TR 38.821, is the validity time of ephemeris data. Predictions of satellite positions in general degrade with increasing age of the ephemeris data used, due to atmospheric drag, maneuvering of the satellite, imperfections in the orbital models used, etc. Therefore, the publicly available TLE data are updated quite frequently, for example. The update frequency depends on the satellite and its orbit and ranges from weekly to multiple times a day for satellites on very low orbits which are exposed to strong atmospheric drag and need to perform correctional maneuvers often.

So, while it seems possible to provide the satellite position with the required accuracy, care needs to be taken to meet these requirements such as, for example, when choosing the ephemeris data format or the orbital model to be used for the orbital propagation.

In the Release 17 3GPP work item on NR NTN, the following agreements have been made regarding ephemeris broadcast:

Support serving-satellite ephemeris broadcast based on one or more of the following:
- Set 1: Satellite position and velocity state vectors:
  - position X, Y, Z in ECEF (m)
  - velocity VX, VY, VZ in ECEF (m/s)
- Set 2: At least the following parameters in orbital parameter ephemeris format:
  - Semi-major axis α [m]
  - Eccentricity e
  - Argument of periapsis ω [rad]
  - Longitude of ascending node Ω [rad]
  - Inclination i [rad]
  - Mean anomaly M [rad] at epoch time $t_o$
    - For Future Study (FFS): Whether pre-provisioned ephemeris based on orbital elements can be used as reference. Thereby, only delta corrections can be broadcast in order to reduce the overhead
- FFS: The field size for each parameter
- FFS: The impact on signaling due to the required accuracy of serving-satellite ephemeris
- FFS: Whether down-selection is needed or both sets are supported Specifications should support delivery of ephemeris information using both ephemeris formats, i.e., state vectors and orbital elements.

In Release 17 study item on IoT NTN, the following agreement was made regarding UL synchronization timer for NTN.

A validity timer for UL synchronization (e.g., for satellite ephemeris and potentially other aspects) configured by the network is recommended.
- Details such as, for example, when to set/reset the timer, timer duration and UE behavior upon timer expiry, can be discussed in the normative phase To handle the timing and frequency synchronization in a NR or LTE based NTN, the device can be equipped with a GNSS receiver. The GNSS receiver allows a device to estimate its geographical position. The UE can then determine the propagation delay, the delay variation, the Doppler shift and its variation rate based on its own and the satellite location information.

Different levels of integration of the GNSS chip in a 3GPP cellular modem can be anticipated. The agreed Release 17 work item on NR NTN indicates that a UE may support GNSS but not make use of this support during Radio Resource Control (RRC) Connected mode for achieving timing and frequency correction:

Enhancement on the PRACH sequence and/or format and extension of the ra-ResponseWindow duration (in the case of UE with GNSS capability but without pre-compensation of timing and frequency offset capabilities)

The Release 17 study item on NB-IoT and LTE-M for NTN contains a similar indication: GNSS capability in the UE is taken as a working assumption in this study for both NB-IoT and eMTC devices. With this assumption, UE can estimate and pre-compensate timing and frequency offset with sufficient accuracy for UL transmission. Simultaneous GNSS and NTN NB-IoT/eMTC operation is not assumed.

The background to these 3GPP agreements is that a cellular device may share parts of its Radio Frequency (RF) architecture between the cellular modem and the GNSS chip. A basic solution is to make use of the same antenna for receiving the GNSS reference signal and for receiving and transmitting an LTE or NR signal. A switch determines if the antenna should be connected to the cellular RF frontend or the GNSS RF frontend. The switch provides needed isolation between the cellular transmitter and the GNSS receiver but also prevents simultaneous GNSS and cellular operation.

There currently exist certain challenge(s), however. For example, in the ongoing 3GPP work on NTN, the UE is assumed to acquire its position information from the GNSS data. It can then use its position for various tasks such as calculating time and frequency pre-compensation values. The GNSS data remains valid for a certain period of time and needs to be refreshed via a GNSS position fix. Without a mechanism to maintain valid GNSS data, an NTN system cannot operate.

SUMMARY

Certain aspects of the disclosure and their embodiments may provide solutions to these or other challenges. For example, methods and systems are provided to ensure that a wireless device such as, for example, a UE, has sufficiently accurate GNSS data to enable proper NTN operation. Methods and systems are also provided for determining wireless device and network node behavior when the GNSS data is valid or invalid.

According to certain embodiments, a method by a UE for determining the validity of GNSS data includes maintaining at least one validity timer for determining whether the GNSS data is valid or not valid.

According to certain embodiments, a UE is adapted to and/or includes processing circuitry adapted to or configured to maintain at least one validity timer for determining whether the GNSS data is valid or not valid.

According to certain embodiments, a method by a network node for determining the validity of GNSS data includes, during connection establishment, receiving, from a UE first information associated with a validity of the GNSS data and/or a time-to-first-fix. Based on the first information, the network node performs at least one action.

According to certain embodiments, a network node for determining the validity of GNSS data is adapted to and/or includes processing circuitry adapted to or configured to, during connection establishment, receive, from a UE first information associated with a validity of the GNSS data and/or a time-to-first-fix. Based on the information, the network node is adapted to perform at least one action.

Certain embodiments may provide one or more of the following technical advantage(s). For example, certain embodiments may provide a technical advantage of providing mechanisms to determine GNSS validity and the details of network actions and UE behaviors with regard GNSS validity, which are essential for NTN operation.

As still another example, a technical advantage of certain embodiments may be that task-based or group-based validity timers are provided to ensure validity of GNSS data.

As another example, a technical advantage of certain embodiments may be that methods are provided for determining the validity of GNSS data at the UE/network.

As another example, a technical advantage of certain embodiments may be that UE behavior is defined with regards to the validity of GNSS data.

As still another example, a technical advantage of certain embodiments may be that network actions are defined with regard to the validity of GNSS data.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
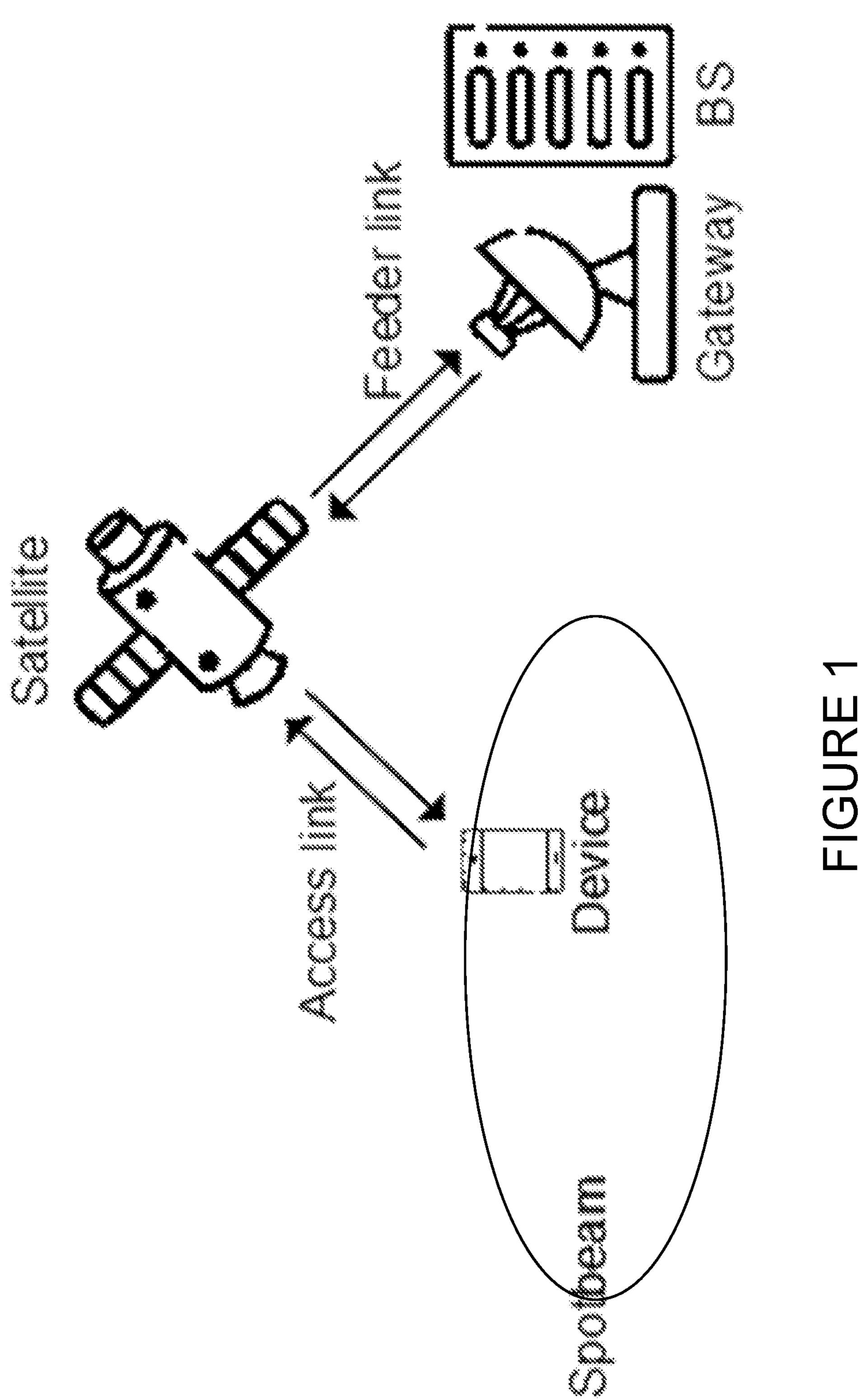
FIG. 1 illustrates an example architecture of a satellite network with bent pipe transponders (i.e. the transparent payload architecture)

Some of the embodiments contemplated herein will now be described more fully with reference to the accompanying drawings. Embodiments are provided by way of example to convey the scope of the subject matter to those skilled in the art.

As used herein, the term node refers to a network node or a user equipment (UE).

Examples of a network node include, but are not limited to, a NodeB, base station (BS), multi-standard radio (MSR) radio node such as MSR BS, eNodeB (eNB), gNodeB (gNB), Master eNB (MeNB), Secondary eNB (SeNB), location measurement unit (LMU), integrated access backhaul (IAB) node, network controller, radio network controller (RNC), base station controller (BSC), relay, donor node controlling relay, base transceiver station (BTS), Central Unit (e.g. in a gNB), Distributed Unit (e.g. in a gNB), Baseband Unit, Centralized Baseband, C-RAN, access point (AP), transmission points, transmission nodes, transmission reception point (TRP), Remote Radio Unit (RRU), Remote Radio Head (RRH), nodes in distributed antenna system (DAS), core network node (e.g. Mobile Switching Center (MSC), Mobility Management Entity (MME) etc), Operations & Maintenance (O&M), Operations Support System (OSS), Self Organizing Network (SON), positioning node (e.g. Evolved Serving Mobile Location Center (E-SMLC), etc.

The non-limiting term UE refers to any type of wireless device communicating with a network node and/or with another UE in a cellular or mobile communication system. Examples of UE are target device, device to device (D2D) UE, vehicular to vehicular (V2V), machine type UE, MTC UE, or UE capable of machine to machine (M2M) communication, Personal Digital Assistant (PDA), tablet, mobile terminals, smart phone, laptop embedded equipment (LEE), laptop mounted equipment (LME), Unified Serial Bus (USB) dongles, etc.

The term radio access technology (RAT) may refer to any RAT e.g. Universal Terrestrial Radio Access (UTRA), Evolved UTRA (E-UTRA), narrow band internet of things (NB-IoT), WiFi, Bluetooth, next generation RAT, New Radio (NR), 4G, 5G, etc. Any of the equipment denoted by the term node, network node or radio network node may be capable of supporting a single or multiple RATs.

The term signal or radio signal used herein can be any physical signal or physical channel. Examples of DL physical signals are reference signal (RS) such as Primary Synchronization Signal (PSS), Secondary Synchronization Signal (SSS), Channel State Information-Reference Signal (CSI-RS), Demodulation Reference Signal (DMRS) signals in Synchronization Signal/Physical Broadcast Channel block (SSB), discovery reference signal (DRS), CRS, Positioning Reference Signal (PRS), etc. RS may be periodic. For example, a RS occasion carrying one or more RSs may occur with certain periodicity such as, for example, 20 ms, 40 ms, etc. The RS may also be aperiodic. Each Synchronization Signal block (SSB) carries New Radio-PSS (NR-PSS), New Radio-SSS (NR-SSS), and New Radio-Physical Broadcast Channel (NR-PBCH) in four successive symbols. One or multiple SSBs are transmitted in one SSB burst, which is repeated with certain periodicity such as, for example, 5 ms, 10 ms, 20 ms, 40 ms, 80 ms and 160 ms.

The UE is configured with information about SSB on cells of certain carrier frequency by one or more SS/PBCH block measurement timing configuration (SMTC) configurations. The SMTC configuration comprising parameters such as SMTC periodicity, SMTC occasion length in time or duration, SMTC time offset with regard to reference time (e.g. serving cell's SFN), etc. Therefore, SMTC occasion may also occur with certain periodicity such as, for example, 5 ms, 10 ms, 20 ms, 40 ms, 80 ms and 160 ms. Examples of UL physical signals are reference signal such as SRS, DMRS, etc. The term physical channel refers to any channel carrying higher layer information such as, for example, data, control, etc. Examples of physical channels are physical broadcast channel (PBCH), Narrowband PBCH (NPBCH), Physical Downlink Control Channel (PDCCH), Physical Downlink Shared Channel (PDSCH), Physical Uplink Control Channel (PUCCH), Short PDSCH (sPDSCH), Short PUCCH (sPUCCH), Short Physical Uplink Shared Channel (sPUSCH), MTC PDCCH (MPDCCH), NPDCCH, NPDSCH, E-PDCCH, Physical Uplink Shared Channel (PUSCH), NPUSCH, etc.

The term time resource used herein may correspond to any type of physical resource or radio resource expressed in terms of length of time. Examples of time resources are: symbol, time slot, subframe, radio frame, Transmission Time Interval (TTI), interleaving time, slot, sub-slot, mini-slot, etc.

Previous methods and techniques for GNSS measurements for NTN UEs include a basic set of GNSS measurement rules for NTN UEs in RRC_Connected, RRC_Idle and RRC_Inactive states. These methods and techniques assume, however, a UE architecture where a GNSS-equipped UE can perform simultaneous GNSS and cellular operation. In a UE architecture where simultaneous operation is not supported, it is inadequate to only specify the GNSS measurement behavior. Accordingly, certain previous solutions address this by providing GNSS measurement rules while imposing restrictions on cellular operation. Additionally or alternatively, some previous solutions propose additional GNSS measurement rules for UEs in RRC_Inactive/RRC_Idle states to limit the amount of GNSS measurements an NTN UE needs to perform when monitoring paging occasions.

According to certain embodiments disclosed herein, a validity timer or validity duration can be defined to ensure that the UL synchronization remains valid. One example is the timer or duration defined for GNSS data. However, though certain embodiments are described as relating to GNSS data, the methods, techniques, and solutions discussed herein are applicable to other validity timers or validity durations, as well.

Furthermore, though previous solutions have touched upon the validity of GNSS data, the techniques disclosed herein provide more specific methods related to determining the validity of GNSS data and UE/network behavior with respect to the validity timer.

As used herein, the GNSS validity timer (GVT) refers to the timer with which the GNSS data is assumed to be valid at least while the timer is running. The timeAlignmentTimer (TAT) means the TA timer specified in 3GPP TR 38.321. When the TAT timer is running, the timing advance command (TAC) received from network is assumed to be valid.

Validity Timers

According to certain embodiments, a validity timer can be defined for the GNSS data that the UE acquires. In a particular embodiment, one or more validity timers or validity periods are defined for a UE's GNSS data depending on the purpose for which the GNSS data is to be used:

For example, a timer T1 runs for a UE's GNSS data when it is to be used for UL synchronization while a timer T2 runs for the same UE's GNSS data when it is to be used to assist SSB measurement for fast random access resource selection, cell selection procedures, etc. In this example, a longer T2 timer, compared to T1 timer, may be enough as the requirement of accuracy of GNSS position is lower for SSB measurement than for TA compensation calculation. As an alternative approach, timer T2 may be started when timer T1 expires, or vice versa.

In another particular embodiment, the UE runs only one validity timer for its GNSS data but different validity conditions are defined (i.e., UE behavior is specified) depending on the purpose for which the GNSS data is to be used.

For example, the UE runs a timer T1 after refreshing the GNSS data. If the timer exceeds a certain threshold t_a, it is deemed invalid for UL compensation (which may concern TA pre-compensation and/or Doppler shift compensation). If it exceeds another threshold t_b (say t_b>=t_a), it is deemed invalid for cell selection. The timer expires upon reaching threshold t_c where t_b<=t_c in this example. If the UE needs to perform UL pre-compensation, the UE needs to refresh the GNSS data if the GNSS data is invalid, Similarly, if the UE needs to perform cell selection, the UE needs to refresh the GNSS data if the GNSS data is invalid. However, the validity conditions are or may be different for the two cases.

Generally, there can be up to K validity conditions for the GNSS validity timer. In the above example, there were K=2 validity conditions. One particular embodiment of the validity condition is to compare the timer value with a threshold, but other or additional validity conditions can also be defined (as described elsewhere in this document).

In another particular embodiment, the network configures the parameters related to the GNSS validity timer. This configuration can be broadcast via SI and/or via RRC configuration, e.g. using dedicated RRC signaling, and/or via MAC signaling such as by using a new MAC Control Element.

For example, in a particular embodiment, the network broadcasts generic parameters in the System Information (SI) related to validity timer(s) for one or more satellites visible to or relevant for the UEs in a certain cell. The network may send refined information to the UEs in connected mode, e.g. using dedicated RRC or MAC signaling.

In a particular embodiment, the UE resets a validity timer when the UE refreshes the GNSS data.

Time Alignment Timer (TAT)

According to certain embodiments, when both GNSS validity timer(s) and TAT are configured, the TAT is assumed to be expired and should be reset when the GNSS validity timer expires and is reset. In this case, a RA for UL synchronization may be triggered with a PRACH preamble transmitted with the updated timing compensation. UL synchronization is needed as the TA calculated may be not reliable anymore due to the pre-compensation time being updated.

In a particular embodiment, the GNSS validity timer should be larger than the TAT.

In another particular embodiment, the GVT can be defined as multiples of TAT, e.g. $T_{GVT}=n*T_{TAT}$, where n is a scaling factor which can be configured in RRC (e.g. in SIB1) or be a predetermined value.

When multiple GVTs are defined, multiple scaling factors can be configured for different use cases.

a time duration with an offset time added to the TAT, e.g. $T_{GVT}=T_{TAT}+T_{offset}$, where $T_{offset}$ is a time offset which can be configured in RRC (e.g. in SIB1) or be a predetermined value.

When multiple GVTs are defined, multiple time offset values can be configured for different use cases.

In another particular embodiment, when both GNSS validity timer(s) and TAT are configured, when the GNSS validity timer expires, the TAT is assumed to be expired only when the pre-compensation time change is larger or no less than a time threshold or is out of a range of values, which can be:

predetermined

As an example, a predetermined value range can be defined as described below, and if the pre-compensation time change is not within the range, a new RA is triggered, and the TAT is reset.

As is known, in NR, without RA, a 6-bit TAC is used to adjust the UL timing so that the UL timing is aligned with DL timing to some extent. According to section 4.2 of 3GPP TS 38.213 v 16.6.0, the range of the adjusted values is expressed in following formula, which can be used for this purpose:

$$\left[-31*16*\frac{64}{2^{\mu}},\, 32*16*\frac{64}{2^{\mu}}\right]*T_c$$

where $$T_c=\frac{1}{480*10^3*4096}\text{ seconds,}$$

and μ is defined in following table.

Table 4.2-1 of 3GPP TS38.211 v 16.6.0: Supported transmission numerologies.

| μ | Δf = $2^{\mu}\cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

or a value configured by network

As an example, a threshold value can be defined in SIB1 and broadcast to the UEs in the cell so that UE knows that once the absolute pre-compensation time change is larger than or no less than the threshold, an RA procedure should be triggered and the TAT should be reset when a TA Command is received in a RAR message for a serving cell belonging to a Timing Advance Group (TAG) if 4-step RACH is selected or in a MsgB for an SpCell if a 2-step RACH is selected.

With this method, in a particular embodiment, a RA for UL synchronization may be only triggered with a PRACH preamble transmitted with the updated timing compensation only when a normal 6 bit TAC cannot adjust the timing shift due to the pre-compensation time change. In other cases, the 6-bit TAC will be relied on to adjust the uplink transmission time so that the UL timing and DL timing at gNB side can be aligned.

Additional Information Related to GNSS Information Validity

The information a UE can derive from GNSS signals includes the UE's position, a time reference, and a frequency reference. This information is referred to as "components" below.

In some embodiments, separate validity timers may be configured for these different components. That is, in a particular example embodiment, the following validity timers may be configured:

one validity timer, $T_{position\_validity}$, may be defined for the UE's position data, one validity timer, $T_{time\text{-}ref\_validity}$, may be defined for the time reference information, and/or one validity timer, $T_{freq\text{-}ref\_validity}$, may be defined for the frequency reference information.

In a particular embodiment, all or a subset of the above-described validity timers are configured by the network. For example, the network may transmit configuration data that indicates a timer period to the UE. As another example, the network may transmit a timer duration, a start value, an expiration value, an end time, etc. using any of the previously described communication methods. In another particular embodiment, all or a subset of the above-described validity timers are specified in a standard. Combinations of these two options are also conceivable such as where one subset of the timers is configured by the network, while another subset of the timers is specified in a standard. As yet another option (which may be combined with any of the above options), the UE may autonomously choose the values for all or a subset of the validity timers. As still another option, the UE may choose the values for all or a subset of the timers based at least in part on assistance information received from the network (and/or assistance information specified in a standard), where such assistance information may include, for example, a mathematical formula, parameters (e.g. constants) to be inserted in an algorithm or formula for derivation of timer values, rules for setting timer values (where the rules may be based on aspects like, for example, the UE's speed, the UE's GNSS capability, the quality of its GNSS receiver, the number of GNSS satellites the GNSS information is derived from, the quality, the SNR of the received GNSS signals from which the information is derived, etc.), allowed maximum and/or minimum values, and/or allowed ranges for the timer values.

As an alternative to using regular validity timers, the time dependence of relevant errors may be indicated or otherwise provided from the network as configuration data by any of the previously described methods. The errors and their respective time dependence may be divided into the above described components.

As one example, a UE may be configured with or may autonomously derive (where, as one option, configuration may be used for a subset of the "components" while autonomous derivation may be used for another subset) any one or more of:

the time dependence of the UE position error (e.g. in terms of the $95^{th}$ percentile error), the time dependence of the time reference error (where this time dependence may be related to the stability of the UE's internal clock) (e.g. in terms of the $95^{th}$ percentile error), and/or the time dependence of the frequency reference error (where this time dependence may be related to the stability of the UE's internal oscillator) (e.g. in terms of the $95^{th}$ percentile error).

The time dependence of an error may be expressed as a function of time (i.e. f(t)). This may be a linear function, or a function that also includes higher order terms, such as $t^2$ terms, $t^3$ terms, . . . $t^n$ terms. Any other mathematical formula or algorithm is also conceivable.

As a further option, multiple time dependence functions could be provided for a single (e.g. each) component, where each time dependence function is related to a different error probability, e.g. one function for the $95^{th}$ percentile error, one function for the $85^{th}$ percentile error and one function for the $75^{th}$ percentile error.

The above described time dependence information (with time dependence functions for the error of different components, optionally with multiple functions for each component) may optionally be combined with conditions such as, for example, in terms of error thresholds or error probability thresholds (e.g. a threshold size for the $95^{th}$ percentile error of a component), which, when fulfilled (e.g., when a threshold is exceeded) triggers the UE to consider the component information to be invalid.

In a particular embodiment, yet another option could be to use a single timer with separate validity conditions for different components (e.g., the UE's position information is considered to be invalid when the validity timer has been running for a time period $t_{position}$, the time reference information is considered to be invalid when the validity timer has been running for a time period $t_{time\text{-}ref}$, and/or the frequency reference information is considered to be invalid when the validity timer has been running for a time period $t_{freq\text{-}ref}$.

In a particular embodiment, yet another option, different timers may be associated with different error levels (e.g., different levels of the $95^{th}$ percentile error) for a single (e.g. each) component.

Determining GNSS Validity in RRC_CONNECTED State

In a particular embodiment, the UE determines whether the GNSS data will remain valid during a connection. This can be determined either prior to accessing the network, during the connection establishment procedure, or after establishing connection. To this end, the UE needs to know the anticipated connection duration and compare it with the remaining duration until the GNSS will remain valid.

In another embodiment, the UE shares information about validity duration of GNSS data with the network during connection establishment, and the network indicates to the UE whether or not its GNSS data is expected to remain valid during the connection.

In yet another embodiment, the network determines the expected connection duration and indicates it to the UE. Upon receiving the expected connection duration, the UE determines whether the GNSS data will remain valid during a connection by comparing the validity timer value with the expected connection duration.

For example, for a NTN UE, the connection duration can be determined based on the satellite/UE position information (and/or feeder link delay or gNB-UE propagation delay), resource configuration, number of repetitions, UE power class, bandwidth, number of allocated tones, and the amount of data to be transmitted.

- The connection duration of an eMTC UE can be approximately calculated based on the maximum number of repetitions for its coverage enhancement (CE) mode, the resource configuration information, and satellite/UE position information. A UE in CE mode A can use a maximum of 32 repetitions for data channels whereas that in CE mode B can use a maximum of 2048 repetitions.
- The connection duration of an NB-IoT UE can be approximately calculated based on the number of repetitions that it used for its NPRACH coverage class along with other assistance information mentioned previously.

UE Behavior in RRC_CONNECTED State

According to certain and various embodiments, if the GNSS validity timer expires in the RRC connected mode, there are different possibilities for UE behavior:

- Option 1: The UE is allowed to complete both UL transmission and DL reception
- Option 2: The UE is allowed to complete DL reception but not UL transmission unless it refreshes GNSS data in a measurement/transmission gap
- Option 3: The UE is allowed to complete DL reception. In this case, if the UE would like to initiate UL transmission, the UE would need to leave RRC Connected state and enters RRC Idle state to restart the procedure.
- Option 4: The UE remains in RRC_CONNECTED state, refrains from UL transmissions and immediately (or as soon as possible) acquires GNSS position fix and then resumes normal RRC_CONNECTED state operation (i.e. stops refraining from UL transmissions).

In a particular embodiment, one or more of the above UE behaviors are specified in the specification.

In another particular embodiment, the network indicates to the UE which of the specified UE behaviors is configured. This information can be signaled to the UE in RRC configuration or broadcast in the SI.

Network Actions

In another embodiment, if the network has information about the remaining time until the GNSS data validity expires for a UE and/or the time-to-fix for a UE, the network may choose to perform one or more of the following actions:

- determine if one or more validity timer(s) may expire during the ongoing connection;
- indicate it to the UE that its validity timer may expire during the ongoing connection;
- indicate the time instant (e.g., subframe, slot, or symbol) in which the timer may expire;
- command the UE to refresh its GNSS data at or after a certain time instant and/or within a certain time duration;
- configure measurement gap(s) for the UE if the validity timer may expire during an ongoing connection; and/or
- account for the additional delay due to reacquisition of GNSS data by the UE before timing out the connection or a radio link failure is declared.

UE Behavior in RRC_IDLE/RRC_INACTIVE State

In one embodiment, a UE in RRC_IDLE or RRC_INACTIVE state acquires GNSS position fix when

- the validity timer expires;
- UE needs to access the cell and the validity timer is expired;
- UE needs to access the cell, the validity timer has not expired but the time until the timer expires is shorter than the minimum time required to complete the task which requires valid GNSS information (e.g., long UL transmission);
- UE wakes up from power saving mode;
- the network sends a command;
- the UE needs to perform cell (re-)selection and the validity timer is expired; or
- any of the other events described herein.

Using Validity Timer for Cell (Re)Selection

If a UE has outdated GNSS data, the calculated time and frequency pre-compensation values will be erroneous.

In a particular embodiment, on top of the GNSS validity timer expiration, when SS-RSRP of all the SSBs measured are below a threshold, cell reselection is needed. This is the case since the link quality is also bad in DL and a PRACH resource may also be randomly selected if UE tries to access this cell.

As is known, in RRC_CONNECTED, the UE measures multiple beams (at least one) of a cell and the measurements results (power values) are averaged to derive the cell quality. In doing so, the UE is configured to consider a subset of the detected beams. Filtering takes place at two different levels: at the physical layer to derive beam quality, and then at RRC level to derive cell quality from multiple beams. Cell quality from beam measurements is derived in the same way for the serving cell(s) and for the non-serving cell(s).

An example high-level measurement model is disclosed in 3GPP TS 38.300 V.16.5.0. To avoid complex cell quality measurement for cell selection, the simple SS-RSRP measurement is used together with the EVT validation in NTN to determine whether a cell selection should be applied.

Figure 3:
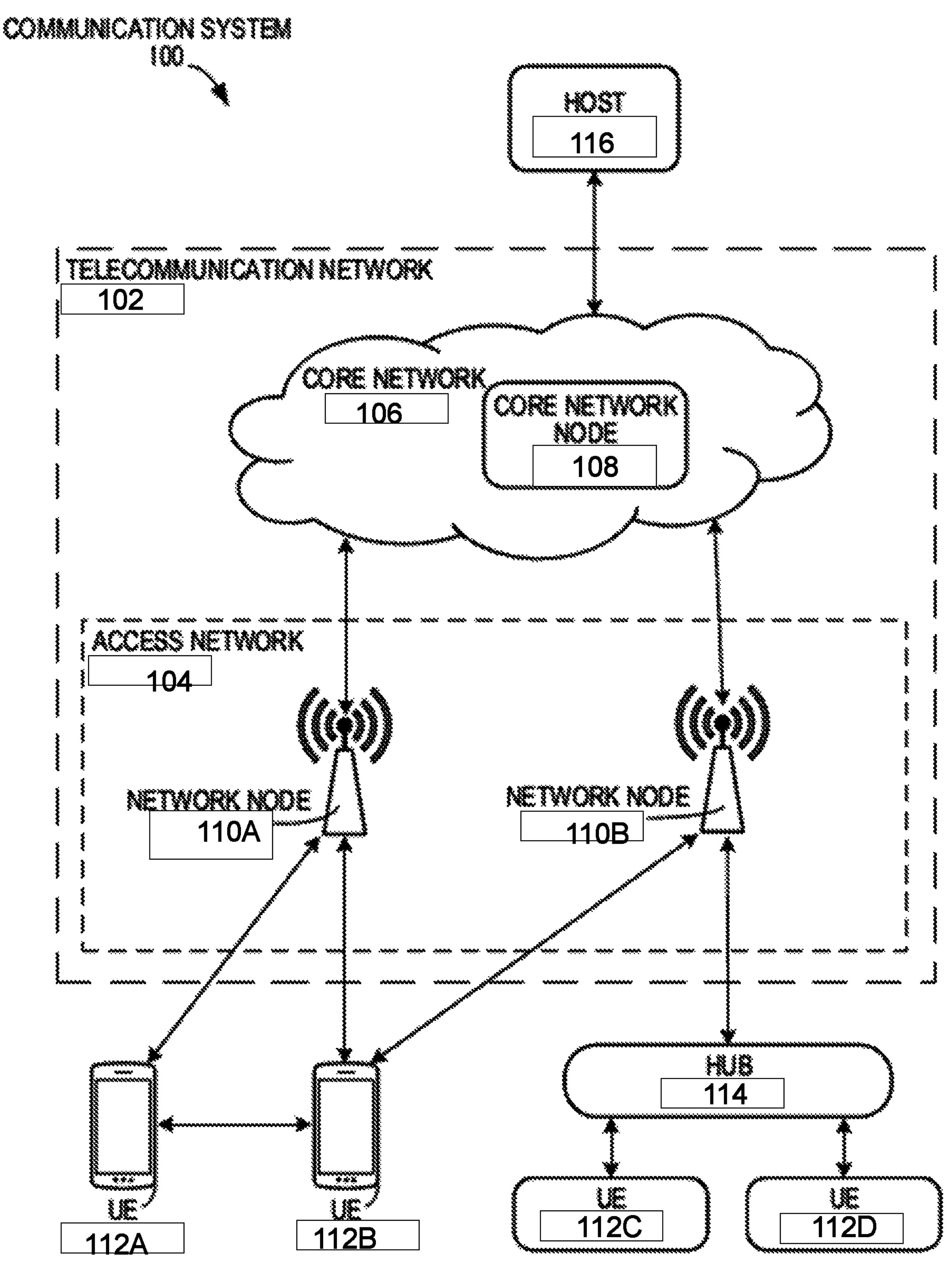
FIG. 3 illustrates an example of a communication system, according to certain embodiments.

FIG. 3 shows an example of a communication system 100 in accordance with some embodiments. In the example, the communication system 100 includes a telecommunication network 102 that includes an access network 104, such as a radio access network (RAN), and a core network 106, which includes one or more core network nodes 108. The access network 104 includes one or more access network nodes, such as network nodes 110*a* and 110*b* (one or more of which may be generally referred to as network nodes 110), or any other similar 3$^{rd}$ Generation Partnership Project (3GPP) access node or non-3GPP access point. The network nodes 110 facilitate direct or indirect connection of user equipment (UE), such as by connecting UEs 112*a*, 112*b*, 112*c*, and 112*d* (one or more of which may be generally referred to as UEs 112) to the core network 106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 100 may include any number of wired or wireless networks, network nodes, UEs, and/or any other components or systems that may facilitate or participate in the communication of data and/or signals whether via wired or wireless connections. The communication system 100 may include and/or interface with any type of communication, telecommunication, data, cellular, radio network, and/or other similar type of system.

The UEs 112 may be any of a wide variety of communication devices, including wireless devices arranged, configured, and/or operable to communicate wirelessly with the network nodes 110 and other communication devices. Similarly, the network nodes 110 are arranged, capable, configured, and/or operable to communicate directly or indirectly with the UEs 112 and/or with other network nodes or equipment in the telecommunication network 102 to enable and/or provide network access, such as wireless network access, and/or to perform other functions, such as administration in the telecommunication network 102.

In the depicted example, the core network 106 connects the network nodes 110 to one or more hosts, such as host 116. These connections may be direct or indirect via one or more intermediary networks or devices. In other examples, network nodes may be directly coupled to hosts. The core network 106 includes one more core network nodes (e.g., core network node 108) that are structured with hardware and software components. Features of these components may be substantially similar to those described with respect to the UEs, network nodes, and/or hosts, such that the descriptions thereof are generally applicable to the corresponding components of the core network node 108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 116 may be under the ownership or control of a service provider other than an operator or provider of the access network 104 and/or the telecommunication network 102, and may be operated by the service provider or on behalf of the service provider. The host 116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 100 of FIG. 3 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 102 is a cellular network that implements 3GPP standardized features. Accordingly, the telecommunications network 102 may support network slicing to provide different logical networks to different devices that are connected to the telecommunication network 102. For example, the telecommunications network 102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 112 are configured to transmit and/or receive information without direct human interaction. For instance, a UE may be designed to transmit information to the access network 104 on a predetermined schedule, when triggered by an internal or external event, or in response to requests from the access network 104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio—Dual Connectivity (EN-DC).

In the example, the hub 114 communicates with the access network 104 to facilitate indirect communication between one or more UEs (e.g., UE 112*c* and/or 112*d*) and network nodes (e.g., network node 110*b*). In some examples, the hub 114 may be a controller, router, content source and analytics, or any of the other communication devices described herein regarding UEs. For example, the hub 114 may be a broadband router enabling access to the core network 106 for the UEs. As another example, the hub 114 may be a controller that sends commands or instructions to one or more actuators in the UEs. Commands or instructions may be received from the UEs, network nodes 110, or by executable code, script, process, or other instructions in the hub 114. As another example, the hub 114 may be a data collector that acts as temporary storage for UE data and, in some embodiments, may perform analysis or other processing of the data. As another example, the hub 114 may be a content source. For example, for a UE that is a VR headset, display, loudspeaker or other media delivery device, the hub 114 may retrieve VR assets, video, audio, or other media or data related to sensory information via a network node, which the hub 114 then provides to the UE either directly, after performing local processing, and/or after adding additional local content. In still another example, the hub 114 acts as a proxy server or orchestrator for the UEs, in particular in if one or more of the UEs are low energy IoT devices.

The hub 114 may have a constant/persistent or intermittent connection to the network node 110*b*. The hub 114 may also allow for a different communication scheme and/or schedule between the hub 114 and UEs (e.g., UE 112*c* and/or 112*d*), and between the hub 114 and the core network 106. In other examples, the hub 114 is connected to the core network 106 and/or one or more UEs via a wired connection. Moreover, the hub 114 may be configured to connect to an M2M service provider over the access network 104 and/or to another UE over a direct connection. In some scenarios, UEs may establish a wireless connection with the network nodes 110 while still connected via the hub 114 via a wired or wireless connection. In some embodiments, the hub 114 may be a dedicated hub—that is, a hub whose primary function is to route communications to/from the UEs from/to the network node 110*b*. In other embodiments, the hub 114 may be a non-dedicated hub—that is, a device which is capable of operating to route communications between the UEs and network node 110*b*, but which is additionally capable of operating as a communication start and/or end point for certain data channels.

Figure 4:
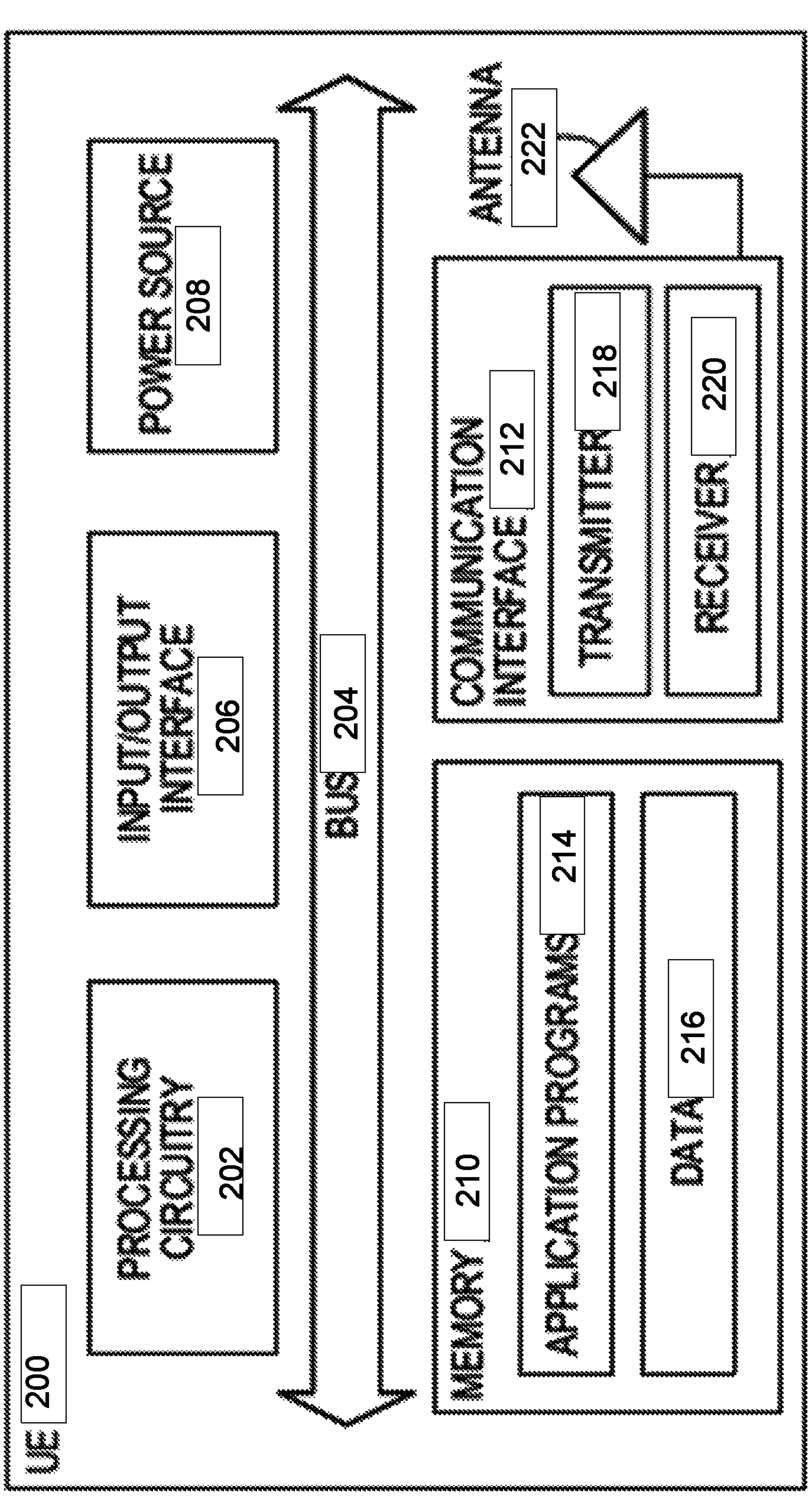
FIG. 4 illustrates an example UE, according to certain embodiments.

FIG. 4 shows a UE 200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 200 includes processing circuitry 202 that is operatively coupled via a bus 204 to an input/output interface 206, a power source 208, a memory 210, a communication interface 212, and/or any other component, or any combination thereof. Certain UEs may utilize all or a subset of the components shown in FIG. 4. The level of integration between the components may vary from one UE to another UE. Further, certain UEs may contain multiple instances of a component, such as multiple processors, memories, transceivers, transmitters, receivers, etc.

The processing circuitry 202 is configured to process instructions and data and may be configured to implement any sequential state machine operative to execute instructions stored as machine-readable computer programs in the memory 210. The processing circuitry 202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 202 may include multiple central processing units (CPUs).

In the example, the input/output interface 206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 208 is structured as a battery or battery pack. Other types of power sources, such as an external power source (e.g., an electricity outlet), photovoltaic device, or power cell, may be used. The power source 208 may further include power circuitry for delivering power from the power source 208 itself, and/or an external power source, to the various parts of the UE 200 via input circuitry or an interface such as an electrical power cable. Delivering power may be, for example, for charging of the power source 208. Power circuitry may perform any formatting, converting, or other modification to the power from the power source 208 to make the power suitable for the respective components of the UE 200 to which power is supplied.

The memory 210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 210 includes one or more application programs 214, such as an operating system, web browser application, a widget, gadget engine, or other application, and corresponding data 216. The memory 210 may store, for use by the UE 200, any of a variety of various operating systems or combinations of operating systems.

The memory 210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 210 may allow the UE 200 to access instructions, application programs and the like, stored on transitory or non-transitory memory media, to off-load data, or to upload data. An article of manufacture, such as one utilizing a communication system may be tangibly embodied as or in the memory 210, which may be or comprise a device-readable storage medium.

The processing circuitry 202 may be configured to communicate with an access network or other network using the communication interface 212. The communication interface 212 may comprise one or more communication subsystems and may include or be communicatively coupled to an antenna 222. The communication interface 212 may include one or more transceivers used to communicate, such as by communicating with one or more remote transceivers of another device capable of wireless communication (e.g., another UE or a network node in an access network). Each transceiver may include a transmitter 218 and/or a receiver 220 appropriate to provide network communications (e.g., optical, electrical, frequency allocations, and so forth). Moreover, the transmitter 218 and receiver 220 may be coupled to one or more antennas (e.g., antenna 222) and may share circuit components, software or firmware, or alternatively be implemented separately.

In the illustrated embodiment, communication functions of the communication interface 212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 200 shown in FIG. 4.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 5:
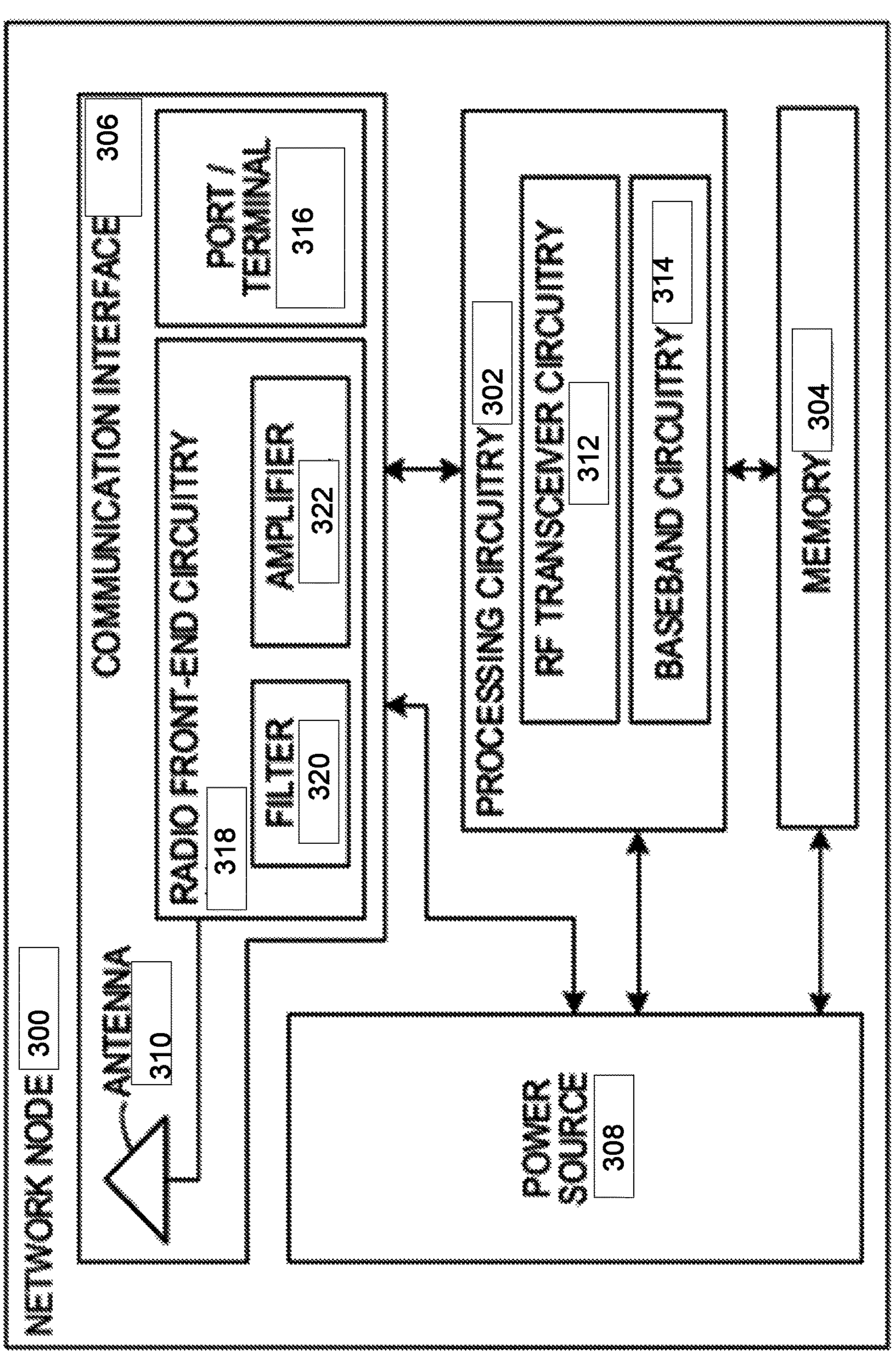
FIG. 5 illustrates an example network node, according to certain embodiments.

FIG. 5 shows a network node 300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 300 includes a processing circuitry 302, a memory 304, a communication interface 306, and a power source 308. The network node 300 may be composed of multiple physically separate components (e.g., a NodeB component and a RNC component, or a BTS component and a BSC component, etc.), which may each have their own respective components. In certain scenarios in which the network node 300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 300 may be configured to support multiple radio access technologies (RATs). In such embodiments, some components may be duplicated (e.g., separate memory 304 for different RATs) and some components may be reused (e.g., a same antenna 310 may be shared by different RATs). The network node 300 may also include multiple sets of the various illustrated components for different wireless technologies integrated into network node 300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 300.

The processing circuitry 302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 300 components, such as the memory 304, to provide network node 300 functionality.

In some embodiments, the processing circuitry 302 includes a system on a chip (SOC). In some embodiments, the processing circuitry 302 includes one or more of radio frequency (RF) transceiver circuitry 312 and baseband processing circuitry 314. In some embodiments, the radio frequency (RF) transceiver circuitry 312 and the baseband processing circuitry 314 may be on separate chips (or sets of chips), boards, or units, such as radio units and digital units. In alternative embodiments, part or all of RF transceiver circuitry 312 and baseband processing circuitry 314 may be on the same chip or set of chips, boards, or units.

The memory 304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 302. The memory 304 may store any suitable instructions, data, or information, including a computer program, software, an application including one or more of logic, rules, code, tables, and/or other instructions capable of being executed by the processing circuitry 302 and utilized by the network node 300. The memory 304 may be used to store any calculations made by the processing circuitry 302 and/or any data received via the communication interface 306. In some embodiments, the processing circuitry 302 and memory 304 is integrated.

The communication interface 306 is used in wired or wireless communication of signaling and/or data between a network node, access network, and/or UE. As illustrated, the communication interface 306 comprises port(s)/terminal(s) 316 to send and receive data, for example to and from a network over a wired connection. The communication interface 306 also includes radio front-end circuitry 318 that may be coupled to, or in certain embodiments a part of, the antenna 310. Radio front-end circuitry 318 comprises filters 320 and amplifiers 322. The radio front-end circuitry 318 may be connected to an antenna 310 and processing circuitry 302. The radio front-end circuitry may be configured to condition signals communicated between antenna 310 and processing circuitry 302. The radio front-end circuitry 318 may receive digital data that is to be sent out to other network nodes or UEs via a wireless connection. The radio front-end circuitry 318 may convert the digital data into a radio signal having the appropriate channel and bandwidth parameters using a combination of filters 320 and/or amplifiers 322. The radio signal may then be transmitted via the antenna 310. Similarly, when receiving data, the antenna 310 may collect radio signals which are then converted into digital data by the radio front-end circuitry 318. The digital data may be passed to the processing circuitry 302. In other embodiments, the communication interface may comprise different components and/or different combinations of components.

In certain alternative embodiments, the network node 300 does not include separate radio front-end circuitry 318, instead, the processing circuitry 302 includes radio front-end circuitry and is connected to the antenna 310. Similarly, in some embodiments, all or some of the RF transceiver circuitry 312 is part of the communication interface 306. In still other embodiments, the communication interface 306 includes one or more ports or terminals 316, the radio front-end circuitry 318, and the RF transceiver circuitry 312, as part of a radio unit (not shown), and the communication interface 306 communicates with the baseband processing circuitry 314, which is part of a digital unit (not shown).

The antenna 310 may include one or more antennas, or antenna arrays, configured to send and/or receive wireless signals. The antenna 310 may be coupled to the radio front-end circuitry 318 and may be any type of antenna capable of transmitting and receiving data and/or signals wirelessly. In certain embodiments, the antenna 310 is separate from the network node 300 and connectable to the network node 300 through an interface or port.

The antenna 310, communication interface 306, and/or the processing circuitry 302 may be configured to perform any receiving operations and/or certain obtaining operations described herein as being performed by the network node. Any information, data and/or signals may be received from a UE, another network node and/or any other network equipment. Similarly, the antenna 310, the communication interface 306, and/or the processing circuitry 302 may be configured to perform any transmitting operations described herein as being performed by the network node. Any information, data and/or signals may be transmitted to a UE, another network node and/or any other network equipment.

The power source 308 provides power to the various components of network node 300 in a form suitable for the respective components (e.g., at a voltage and current level needed for each respective component). The power source 308 may further comprise, or be coupled to, power management circuitry to supply the components of the network node 300 with power for performing the functionality described herein. For example, the network node 300 may be connectable to an external power source (e.g., the power grid, an electricity outlet) via an input circuitry or interface such as an electrical cable, whereby the external power source supplies power to power circuitry of the power source 308. As a further example, the power source 308 may comprise a source of power in the form of a battery or battery pack which is connected to, or integrated in, power circuitry. The battery may provide backup power should the external power source fail.

Embodiments of the network node 300 may include additional components beyond those shown in FIG. 5 for providing certain aspects of the network node's functionality, including any of the functionality described herein and/or any functionality necessary to support the subject matter described herein. For example, the network node 300 may include user interface equipment to allow input of information into the network node 300 and to allow output of information from the network node 300. This may allow a user to perform diagnostic, maintenance, repair, and other administrative functions for the network node 300.

Figure 6:
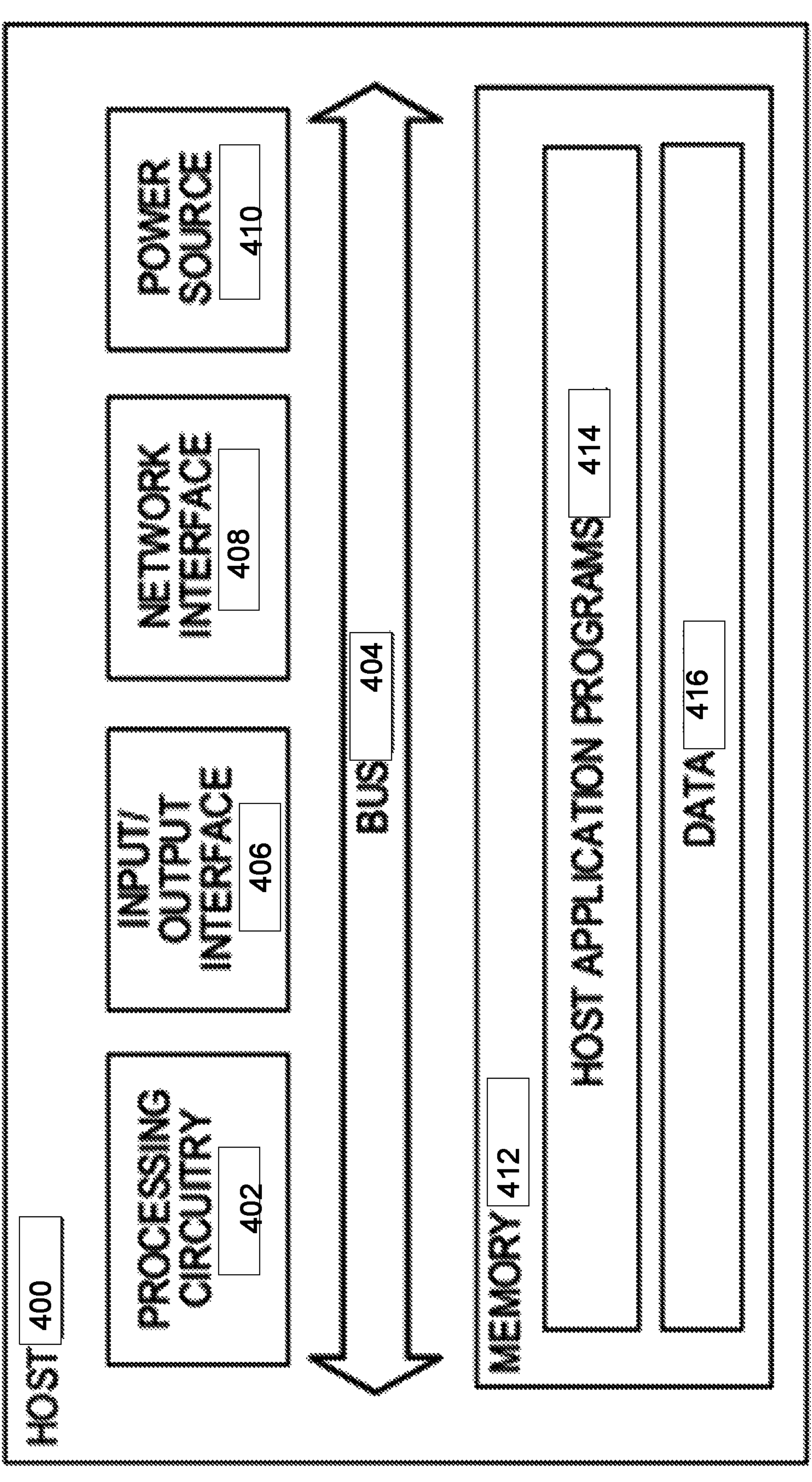
FIG. 6 illustrate an example host, according to certain embodiments.

FIG. 6 is a block diagram of a host 400, which may be an embodiment of the host 116 of FIG. 3, in accordance with various aspects described herein.

As used herein, the host 400 may be or comprise various combinations hardware and/or software, including a standalone server, a blade server, a cloud-implemented server, a distributed server, a virtual machine, container, or processing resources in a server farm. The host 400 may provide one or more services to one or more UEs.

Figure 2:
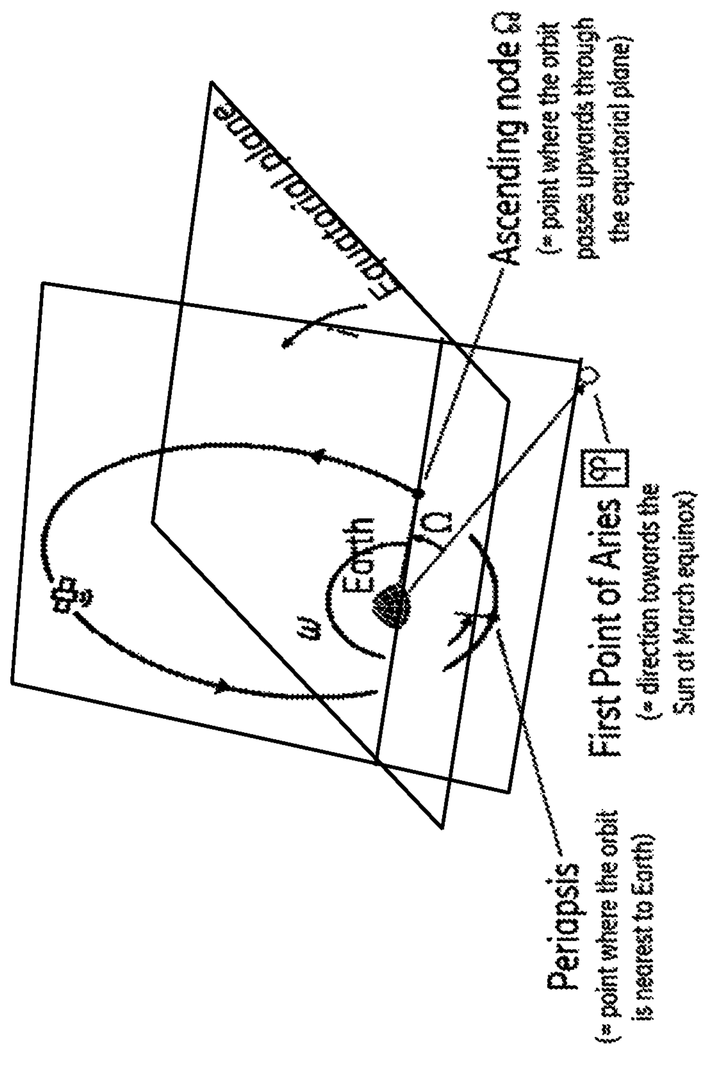
FIG. 2 illustrates orbital elements that include a set of parameters.
Figure 2:
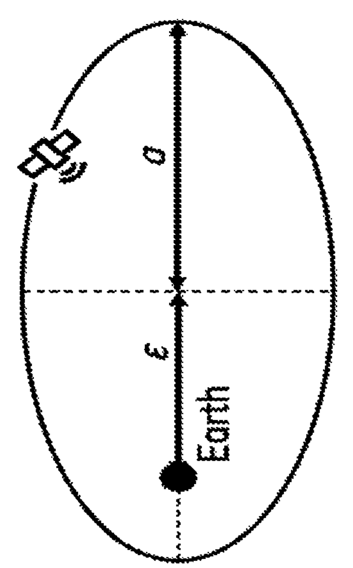

The host 400 includes processing circuitry 402 that is operatively coupled via a bus 404 to an input/output interface 406, a network interface 408, a power source 410, and a memory 412. Other components may be included in other embodiments. Features of these components may be substantially similar to those described with respect to the devices of previous figures, such as FIGS. 2 and 3, such that the descriptions thereof are generally applicable to the corresponding components of host 400.

The memory 412 may include one or more computer programs including one or more host application programs 414 and data 416, which may include user data, e.g., data generated by a UE for the host 400 or data generated by the host 400 for a UE. Embodiments of the host 400 may utilize only a subset or all of the components shown. The host application programs 414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 414 may also provide for user authentication and licensing checks and may periodically report health, routes, and content availability to a central node, such as a device in or on the edge of a core network. Accordingly, the host 400 may select and/or indicate a different host for over-the-top services for a UE. The host application programs 414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 7:
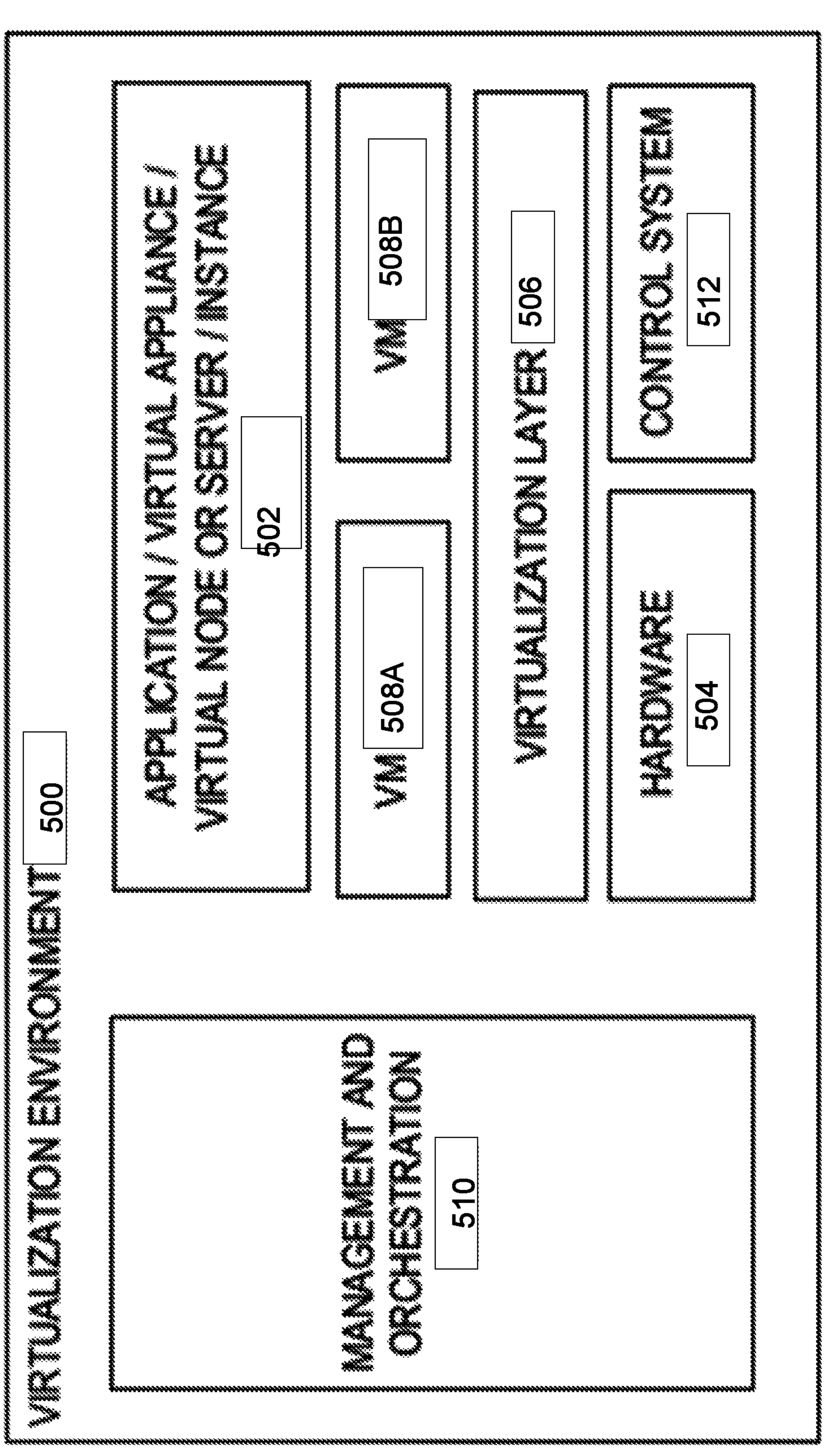
FIG. 7 illustrates a virtualization environment in which functions implemented by some embodiments may be virtualized, according to certain embodiments.

FIG. 7 is a block diagram illustrating a virtualization environment 500 in which functions implemented by some embodiments may be virtualized.

In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 506 (also referred to as hypervisors or virtual machine monitors (VMMs)), provide VMs 508*a* and 508*b* (one or more of which may be generally referred to as VMs 508), and/or perform any of the functions, features and/or benefits described in relation with some embodiments described herein. The virtualization layer 506 may present a virtual operating platform that appears like networking hardware to the VMs 508.

The VMs 508 comprise virtual processing, virtual memory, virtual networking or interface and virtual storage, and may be run by a corresponding virtualization layer 506. Different embodiments of the instance of a virtual appliance 502 may be implemented on one or more of VMs 508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 508 may be a software implementation of a physical machine that runs programs as if they were executing on a physical, non-virtualized machine. Each of the VMs 508, and that part of hardware 504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 508 on top of the hardware 504 and corresponds to the application 502.

Hardware 504 may be implemented in a standalone network node with generic or specific components. Hardware 504 may implement some functions via virtualization. Alternatively, hardware 504 may be part of a larger cluster of hardware (e.g. such as in a data center or CPE) where many hardware nodes work together and are managed via management and orchestration 510, which, among others, oversees lifecycle management of applications 502. In some embodiments, hardware 504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 512 which may alternatively be used for communication between hardware nodes and radio units.

Figure 8:
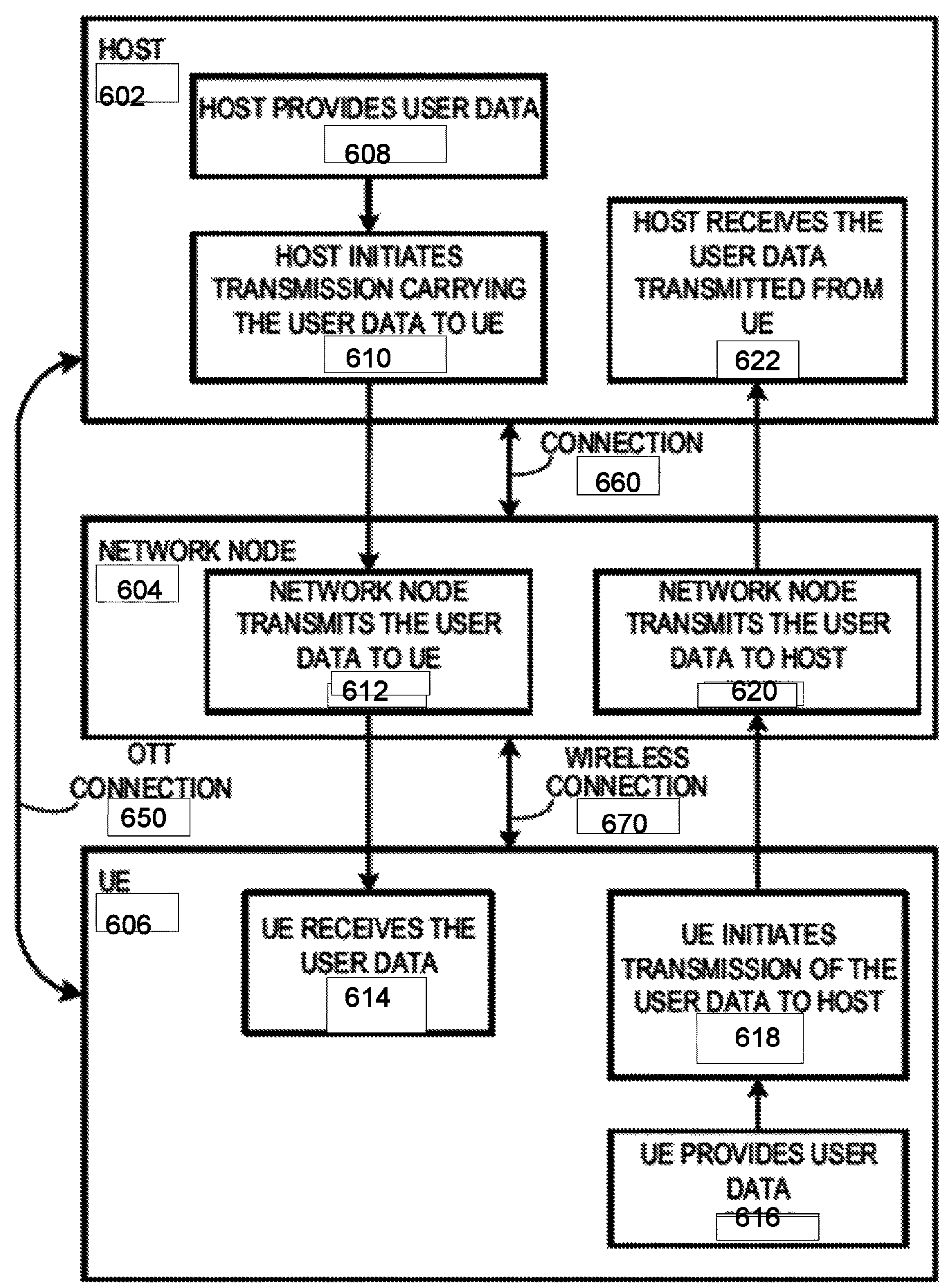
FIG. 8 illustrates a communication diagram of a host communicating via a network node with a UE over a partially wireless connection, according to certain embodiments.

FIG. 8 shows a communication diagram of a host 602 communicating via a network node 604 with a UE 606 over a partially wireless connection in accordance with some embodiments.

Example implementations, in accordance with various embodiments, of the UE (such as a UE 112*a* of FIG. 3 and/or UE 200 of FIG. 4), network node (such as network node 110*a* of FIG. 3 and/or network node 300 of FIG. 5), and host (such as host 116 of FIG. 3 and/or host 400 of FIG. 6) discussed in the preceding paragraphs will now be described with reference to FIG. 8.

Like host 400, embodiments of host 602 include hardware, such as a communication interface, processing circuitry, and memory. The host 602 also includes software, which is stored in or accessible by the host 602 and executable by the processing circuitry. The software includes a host application that may be operable to provide a service to a remote user, such as the UE 606 connecting via an over-the-top (OTT) connection 650 extending between the UE 606 and host 602. In providing the service to the remote user, a host application may provide user data which is transmitted using the OTT connection 650.

The network node 604 includes hardware enabling it to communicate with the host 602 and UE 606. The connection 660 may be direct or pass through a core network (like core network 106 of FIG. 3) and/or one or more other intermediate networks, such as one or more public, private, or hosted networks. For example, an intermediate network may be a backbone network or the Internet.

The UE 606 includes hardware and software, which is stored in or accessible by UE 606 and executable by the UE's processing circuitry. The software includes a client application, such as a web browser or operator-specific "app" that may be operable to provide a service to a human or non-human user via UE 606 with the support of the host 602. In the host 602, an executing host application may communicate with the executing client application via the OTT connection 650 terminating at the UE 606 and host 602. In providing the service to the user, the UE's client application may receive request data from the host's host application and provide user data in response to the request data. The OTT connection 650 may transfer both the request data and the user data. The UE's client application may interact with the user to generate the user data that it provides to the host application through the OTT connection 650.

The OTT connection 650 may extend via a connection 660 between the host 602 and the network node 604 and via a wireless connection 670 between the network node 604 and the UE 606 to provide the connection between the host 602 and the UE 606. The connection 660 and wireless connection 670, over which the OTT connection 650 may be provided, have been drawn abstractly to illustrate the communication between the host 602 and the UE 606 via the network node 604, without explicit reference to any intermediary devices and the precise routing of messages via these devices.

As an example of transmitting data via the OTT connection 650, in step 608, the host 602 provides user data, which may be performed by executing a host application. In some embodiments, the user data is associated with a particular human user interacting with the UE 606. In other embodiments, the user data is associated with a UE 606 that shares data with the host 602 without explicit human interaction. In step 610, the host 602 initiates a transmission carrying the user data towards the UE 606. The host 602 may initiate the transmission responsive to a request transmitted by the UE 606. The request may be caused by human interaction with the UE 606 or by operation of the client application executing on the UE 606. The transmission may pass via the network node 604, in accordance with the teachings of the embodiments described throughout this disclosure. Accordingly, in step 612, the network node 604 transmits to the UE 606 the user data that was carried in the transmission that the host 602 initiated, in accordance with the teachings of the embodiments described throughout this disclosure. In step 614, the UE 606 receives the user data carried in the transmission, which may be performed by a client application executed on the UE 606 associated with the host application executed by the host 602.

In some examples, the UE 606 executes a client application which provides user data to the host 602. The user data may be provided in reaction or response to the data received from the host 602. Accordingly, in step 616, the UE 606 may provide user data, which may be performed by executing the client application. In providing the user data, the client application may further consider user input received from the user via an input/output interface of the UE 606. Regardless of the specific manner in which the user data was provided, the UE 606 initiates, in step 618, transmission of the user data towards the host 602 via the network node 604. In step 620, in accordance with the teachings of the embodiments described throughout this disclosure, the network node 604 receives user data from the UE 606 and initiates transmission of the received user data towards the host 602. In step 622, the host 602 receives the user data carried in the transmission initiated by the UE 606.

One or more of the various embodiments improve the performance of OTT services provided to the UE 606 using the OTT connection 650, in which the wireless connection 670 forms the last segment. More precisely, the teachings of these embodiments may improve one or more of, for example, data rate, latency, and/or power consumption and, thereby, provide benefits such as, for example, reduced user waiting time, relaxed restriction on file size, improved content resolution, better responsiveness, and/or extended battery lifetime.

In an example scenario, factory status information may be collected and analyzed by the host 602. As another example, the host 602 may process audio and video data which may have been retrieved from a UE for use in creating maps. As another example, the host 602 may collect and analyze real-time data to assist in controlling vehicle congestion (e.g., controlling traffic lights). As another example, the host 602 may store surveillance video uploaded by a UE. As another example, the host 602 may store or control access to media content such as video, audio, VR or AR which it can broadcast, multicast or unicast to UEs. As other examples, the host 602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 650 between the host 602 and UE 606, in response to variations in the measurement results. The measurement procedure and/or the network functionality for reconfiguring the OTT connection may be implemented in software and hardware of the host 602 and/or UE 606. In some embodiments, sensors (not shown) may be deployed in or in association with other devices through which the OTT connection 650 passes; the sensors may participate in the measurement procedure by supplying values of the monitored quantities exemplified above, or supplying values of other physical quantities from which software may compute or estimate the monitored quantities. The reconfiguring of the OTT connection 650 may include message format, retransmission settings, preferred routing etc.; the reconfiguring need not directly alter the operation of the network node 604. Such procedures and functionalities may be known and practiced in the art. In certain embodiments, measurements may involve proprietary UE signaling that facilitates measurements of throughput, propagation times, latency and the like, by the host 602. The measurements may be implemented in that software causes messages to be transmitted, in particular empty or 'dummy' messages, using the OTT connection 650 while monitoring propagation times, errors, etc.

Figure 9:
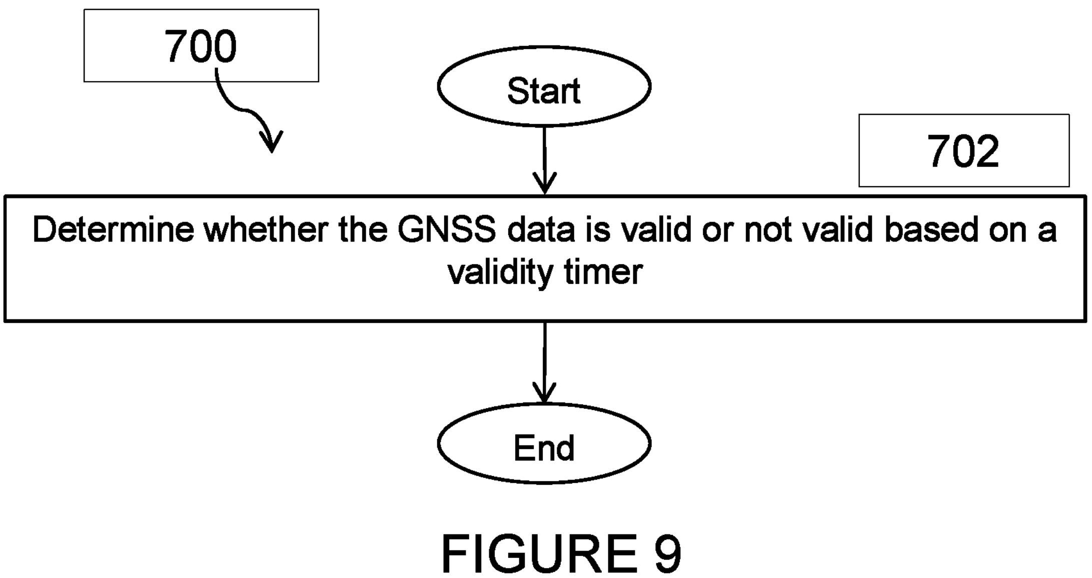
FIG. 9 illustrates an example method by a wireless device, according to certain embodiments.

FIG. 9 illustrates an example method 700 for determining the validity of GNSS data by a wireless device, which may include a UE, according to certain embodiments. The method begins at step 702 when the wireless device determines whether the GNSS data is valid or not valid based on a validity timer.

In a particular embodiment, the wireless device receives the GNSS data and, in response to receiving the GNSS data, starts at least one validity timer.

In a particular embodiment, the wireless device determines whether the GNSS is valid or not valid based on whether the validity timer is expired.

In a further particular embodiment, the at least one validity timer comprises a plurality of validity timers, and each one of the plurality of validity timers is associated with a use for the GNSS data.

In a further particular embodiment, the wireless device determines a use for the GNSS data. The wireless device then determines whether the GNSS data is valid or not valid based on a particular one of the plurality of validity timers that is associated with the use.

In a further particular embodiment, the use is associated with uplink synchronization.

In a further particular embodiment, the use is associated with a synchronization signal block measurement.

In a further particular embodiment, the use is associated with a cell selection procedure.

In a further particular embodiment, the wireless device determines whether the GNSS is valid or not valid is based on whether at least one timer-based condition being fulfilled.

In a further particular embodiment, the at least one timer-based condition comprises at least one threshold amount of time that the at least one validity timer has been running.

In a further particular embodiment, the GNSS is determined to be valid if the threshold amount of time has not been exceeded and the GNSS is determined to be invalid if the threshold amount of time has been exceeded.

In a further particular embodiment, the at least one timer-based condition comprises a plurality of threshold amounts of time that the at least one validity timer has been running, and each of the plurality of threshold amounts of time being associated with a use for the GNSS data.

In a particular embodiment, the wireless device determines a use for the GNSS data, and the GNSS data is determined to be valid or not valid based on a particular one of the plurality of threshold amounts of time that is associated with the use has been exceeded. In a further particular embodiment, the use is associated with uplink synchronization. In a further particular embodiment, the use is associated with a synchronization signal block measurement. In a further particular embodiment, the use is associated with a cell selection procedure.

In a particular embodiment, the wireless device receives, from a network node, at least one parameter associated with the at least one validity timer.

In a particular embodiment, the at least one validity timer comprises a GNSS validity timer and a time alignment timer.

In a particular embodiment, the wireless device determines that the time alignment timer is expired based on at least one of: an expiration of the GNSS validity timer; and an expiration of the GNSS validity timer by more than a threshold amount.

In a particular embodiment, the wireless device determines that the at least one validity timer has expired and refreshing the GNSS data.

In a further particular embodiment, the wireless device resets or restarts the at least one validity timer when the GNSS data is refreshed.

In a particular embodiment, the at least one validity timer is associated with at least one of: UE position data; and Time reference information; and Frequency reference information.

In a particular embodiment, the wireless device determines, based on the at least one validity timer, whether the GNSS data will be valid during a connection duration by comparing the connection duration to an amount of time remaining on the at least one validity timer.

In a particular embodiment, upon determination that the at least one validity is expired, the wireless device performs at least one of: completing an uplink transmission and a downlink reception; completing a downlink reception but not an uplink transmission unless GNSS data is refreshed during a measurement and/or transmission gap; completing a downlink reception and transitioning to an RRC Idle state to initiate an uplink transmission; remaining in a RRC connected state, refraining from uplink transmissions while acquiring new GNSS data, and resuming uplink transmissions after new GNSS data is acquired.

In a particular embodiment, the wireless device provides user data and forwards the user data to a host via the transmission to the network node.

Figure 10:
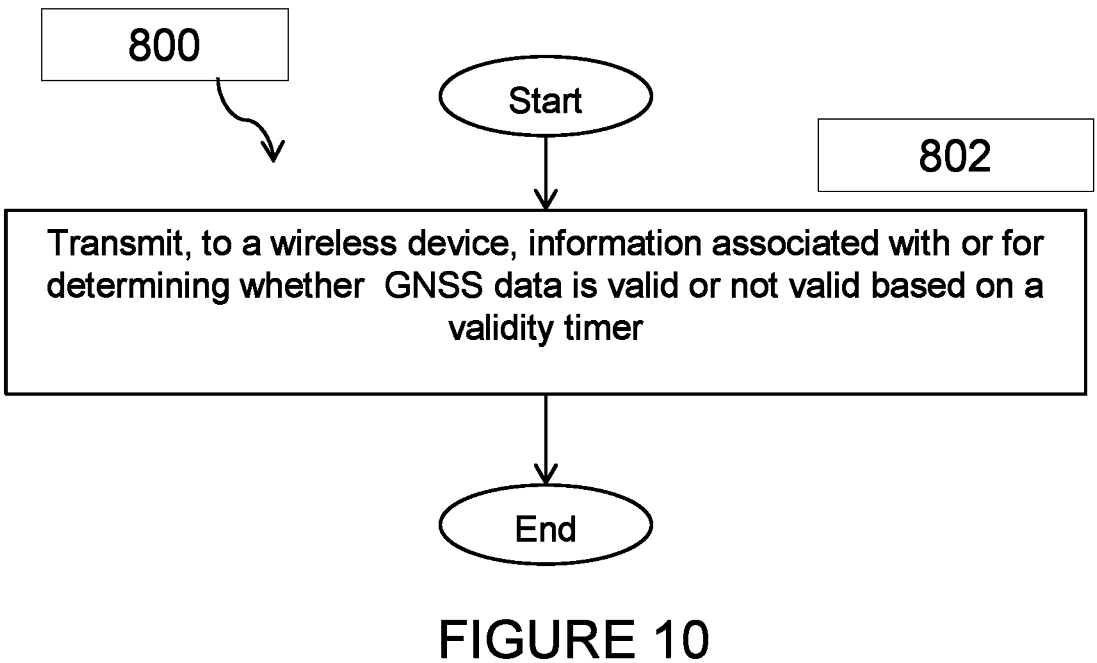
FIG. 10 illustrates an example method by a network node, according to certain embodiments.

FIG. 10 illustrates a method 800 by a network node for determining the validity of GNSS data, according to certain embodiments. The method begins at step 802 when the network node transmits, to a wireless device, information associated with or for determining whether GNSS data is valid or not valid based on a validity timer.

In a particular embodiment, the network node transmits the GNSS data to the wireless device.

In a particular embodiment, the network node maintains the at least one validity timer at the network node. When transmitting the information, the network node transmits information indicating at least one of: whether the at least one validity timer is expired; and an amount of time associated with the at least one validity timer.

In a particular embodiment, the at least one validity timer is maintained at and/or by the wireless device, and when transmitting the information, the network node transmits information indicating at least one parameter associated with the at least one validity timer.

In a particular embodiment, the network node determines whether the GNSS is valid or not valid based on whether the validity timer is expired.

In a further particular embodiment, the at least one validity timer comprises a plurality of validity timers, and each one of the plurality of validity timers is associated with a use for the GNSS data.

In a particular embodiment, the network node determines a use for the GNSS data, and the GNSS data is determined to be valid or not valid based on a particular one of the plurality of validity timers that is associated with the use. In a further particular embodiment, the use is associated with uplink synchronization. In a further particular embodiment, the use is associated with a synchronization signal block measurement. In a further particular embodiment, the use is associated with a cell selection procedure.

In a particular embodiment, the network node determines whether the GNSS is valid or not valid based on whether at least one timer-based condition being fulfilled.

In a further particular embodiment, the at least one timer-based condition comprises at least one threshold amount of time that the at least one validity timer has been running.

In a further particular embodiment, the GNSS is determined to be valid if the threshold amount of time has not been exceeded and the GNSS is determined to be invalid if the threshold amount of time has been exceeded.

In a further particular embodiment, the at least one timer-based condition comprises a plurality of threshold amounts of time that the at least one validity timer has been running, and each of the plurality of threshold amounts of time being associated with a use for the GNSS data.

In a particular embodiment, the network node determines a use for the GNSS data, and the GNSS data is determined to be valid or not valid based on a particular one of the plurality of threshold amounts of time that is associated with the use has been exceeded. In a further particular embodiment, the use is associated with uplink synchronization. In a further particular embodiment, the use is associated with a synchronization signal block measurement. In a further particular embodiment, the use is associated with a cell selection procedure.

In a particular embodiment, the at least one validity timer comprises a GNSS validity timer and a time alignment timer.

In a particular embodiment, the network node determines that the time alignment timer is expired based on at least one of: an expiration of the GNSS validity timer; and an expiration of the GNSS validity timer by more than a threshold amount.

In a particular embodiment, the network node determines that the at least one validity timer has expired and refreshing the GNSS data.

In a further particular embodiment, the network node resets or restarts the at least one validity timer when the GNSS data is refreshed.

In a particular embodiment, the at least one validity timer is associated with at least one of: UE position data; and Time reference information; and Frequency reference information.

In a particular embodiment, the network node determines, based on the at least one validity timer, whether the GNSS data will be valid during a connection duration by comparing the connection duration to an amount of time remaining on the at least one validity timer.

In a particular embodiment, the network node obtains information indicating a remaining time before the at least one validity timer expires and performing at least one of: determining if the at least one validity timer will expire during an ongoing connection of the wireless device; transmit information to the wireless device indicating that the at least one validity timer will expire during an ongoing connection of the wireless device; request the wireless device to refresh the GNSS data immediately; request the wireless device to refresh the GNSS data within a given time period; modify a measurement gap configuration for the wireless device; delaying a timing out of a connection; and delaying a declaration of a radio link failure.

In a particular embodiment, the network node provides user data and forwards the user data to a host via the transmission to the network node.

Figures 11, 12:
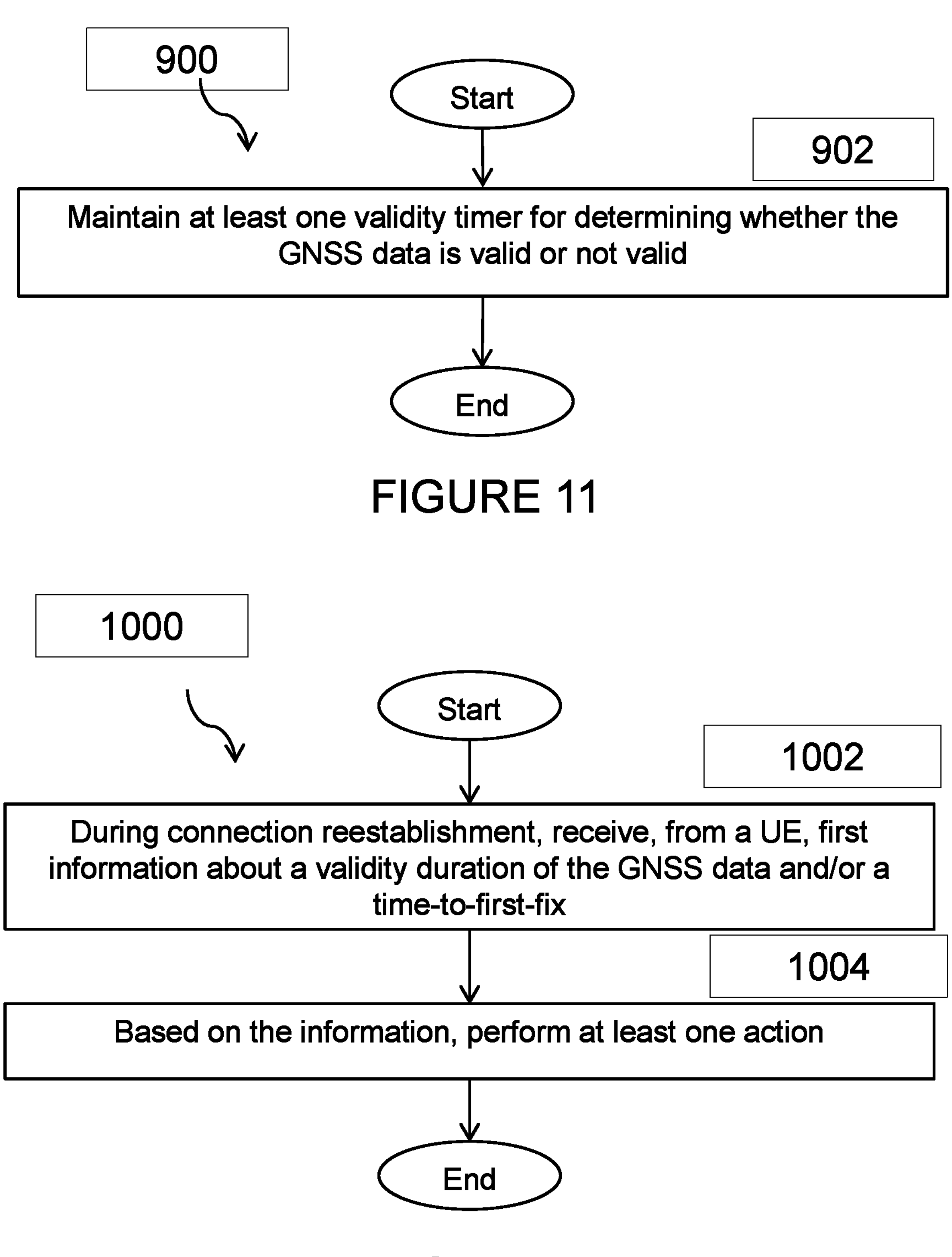
FIG. 11 illustrates another method by a network node for determining the validity of GNSS data, according to certain embodiments.
FIG. 12 illustrates another method by a network node for determining the validity of GNSS data, according to certain embodiments.

FIG. 11 illustrates another method 900 by a UE 112 for determining the validity of GNSS data, according to certain embodiments. The method begins at step 902 when the UE maintains at least one validity timer for determining whether the GNSS data is valid or not valid.

In a particular embodiment, the UE 112 determines whether the GNSS data is valid or not valid based on the at least one validity timer.

In a particular embodiment, the UE 112 determines whether the GNSS data is valid or not valid based on the at least one validity timer comprises determining that the GNSS data is valid when the at least one validity timer is not expired, or determining that the GNSS data is not valid when the at least one validity timer is expired.

In a particular embodiment, during establishment of a connection with a network node 110, the UE 112 transmits, to the network node 110, first information associated with a validity of the GNSS data.

In a particular embodiment, the first information indicates at least one of: an amount of time remaining on the at least one validity timer, a time-to-first-fix the GNSS data, and the connection duration of the connection with the network node.

In a particular embodiment, the UE 112 receives, from the network, second information that: indicates whether or not the GNSS data is expected to remain valid during a connection duration, or is used to determine whether or not the GNSS data is expected to remain valid during the connection duration.

In a particular embodiment, the second information indicates the connection duration of the connection with the network node.

In a particular embodiment, the UE 112 determines, based on the at least one validity timer, whether the GNSS data will be valid or not valid during the connection duration comprises comparing the connection duration to the amount of time remaining on the at least one validity timer.

In a particular embodiment, maintaining the at least one validity timer comprises: receiving the GNSS data; and in response to receiving the GNSS data, starting the at least one validity timer.

In a particular embodiment, the UE 112 determines whether the GNSS data is valid or not valid is based on whether at least one timer-based condition is fulfilled.

In a particular embodiment, the at least one timer-based condition comprises a threshold amount of time that the at least one validity timer has been running.

In a particular embodiment, the GNSS data is determined to be valid if the threshold amount of time has not been exceeded and the GNSS data is determined to be invalid if the threshold amount of time has been exceeded.

In a particular embodiment, the at least one timer-based condition comprises a plurality of threshold amounts of time that the at least one validity timer has been running, each of the plurality of threshold amounts of time being associated with a respective one of a plurality of uses for the GNSS data.

In a particular embodiment, the UE 112 determines a use for the GNSS data, and the GNSS data is determined to be valid or not valid based on whether a particular one of the plurality of threshold amounts of time that is associated with the use has been exceeded.

In a particular embodiment, the use is associated with at least one of: uplink synchronization, a synchronization signal block measurement, and a cell selection procedure.

In a particular embodiment, the at least one validity timer comprises a plurality of validity timers, and each one of the plurality of validity timers is associated with a use for the GNSS data.

In a particular embodiment, the UE 112 receives, from a network node, at least one parameter associated with the at least one validity timer.

In a particular embodiment, the at least one validity timer comprises at least one GNSS validity timer and a time alignment timer.

In a particular embodiment, the UE 112 determines that the time alignment timer is expired based on at least one of: an expiration of the GNSS validity timer; and an expiration of the GNSS validity timer by more than a threshold amount.

In a particular embodiment, the UE 112 acquires new GNSS data and resets or restarts the time alignment timer.

In a particular embodiment, the at least one validity timer is associated with at least one of: UE position data; time reference information; and frequency reference information.

In a particular embodiment, the UE 112 determines that the at least one validity timer has expired. Upon determining that the at least one validity is expired, the UE 112 performs at least one of: completing an uplink transmission and a downlink reception; completing a downlink reception but not an uplink transmission unless GNSS data is refreshed during a measurement and/or transmission gap; completing a downlink reception and transitioning to an Radio Resource Control, RRC, Idle state; remaining in a RRC connected state, refraining from uplink transmissions while acquiring new GNSS data; resuming uplink transmissions after new GNSS data is acquired, and resetting or restarting the at least one validity timer when the new GNSS data is acquired.

FIG. 12 illustrates another method 1000 by a network node 110 for determining the validity of GNSS data, according to certain embodiments. The method begins at step 1002 when the network node receives, during connection reestablishment, and from a UE 112, first information about a validity duration of the GNSS data and/or a time-to-first fix. At step 1004, the network node 110 performs at least one action based on the first information.

In a particular embodiment, the first information indicates at least one of: an amount of time remaining on the at least one validity timer, and a connection duration of the connection with the UE.

In a particular embodiment, performing the at least one action comprises transmitting, to the UE, second information that: indicates whether or not the GNSS data is expected to remain valid during a connection duration, or is used to determine whether or not the GNSS data is expected to remain valid during the connection duration.

In a particular embodiment, the second information indicates the connection duration of the connection with the UE.

In a particular embodiment, the network node 110 maintains, at the network node 110, at least one validity timer for determining whether the GNSS data is valid or not valid.

In a particular embodiment, maintaining the at least one validity timer comprises: transmitting the GNSS data to the UE; and in response to transmitting the GNSS data, starting the at least one validity timer.

In a particular embodiment, the network node 110 determines whether the GNSS data is valid or not valid based on the at least one validity timer.

In a particular embodiment, determining whether the GNSS data is valid or not valid based on the at least one validity timer comprises comparing the connection duration to the amount of time remaining on the at least one validity timer.

In a particular embodiment, determining whether the GNSS data is valid or not valid based on the at least one validity timer comprises: determining that the GNSS data is valid when the at least one validity timer is not expired, or determining that the GNSS data is not valid when the at least one validity timer is expired.

In a particular embodiment, determining whether the GNSS data is valid or not valid is based on whether at least one timer-based condition is fulfilled.

In a particular embodiment, the at least one timer-based condition comprises a threshold amount of time that the at least one validity timer has been running.

In a particular embodiment, the GNSS data is determined to be valid if the threshold amount of time has not been exceeded and the GNSS data is determined to be invalid if the threshold amount of time has been exceeded.

In a particular embodiment, the at least one timer-based condition comprises a plurality of threshold amounts of time that the at least one validity timer has been running, and each of the plurality of threshold amounts of time is associated with a respective one of a plurality of uses for the GNSS data.

In a particular embodiment, the network node 110 determines a use for the GNSS data, and the GNSS data is determined to be valid or not valid based on whether a particular one of the plurality of threshold amounts of time that is associated with the use has been exceeded.

In a particular embodiment, the use is associated with at least one of: uplink synchronization, a synchronization signal block measurement, and a cell selection procedure.

In a particular embodiment, the at least one validity timer is maintained at and/or by the UE, and performing the at least one action comprises transmitting information indicating at least one parameter associated with the at least one validity timer.

In a particular embodiment, the at least one validity timer comprises a plurality of validity timers, and each one of the plurality of validity timers being associated with a use for the GNSS data.

In a particular embodiment, the at least one validity timer comprises at least one GNSS validity timer and a time alignment timer.

In a particular embodiment, determining that the time alignment timer is expired is based on at least one of: an expiration of the GNSS validity timer, and an expiration of the GNSS validity timer by more than a threshold amount.

In a particular embodiment, the network node 110 acquires new GNSS data and resets or restarts the time alignment timer.

In a particular embodiment, the at least one validity timer is associated with at least one of: UE position data; time reference information; and frequency reference information.

In a particular embodiment, the network node 110 determines that the at least one validity timer has expired or will expire during the connection duration of the connection with the UE, and performing the action comprises at least one of: transmitting information to the UE indicating that the at least one validity timer will expire during the connection duration of the connection with the UE; requesting the UE to refresh the GNSS data immediately; requesting the UE to refresh the GNSS data within a given time period; modifying a measurement gap configuration for the UE; delaying a timing out of a connection; and delaying a declaration of a radio link failure.

EXAMPLE EMBODIMENTS

Group A Example Embodiments

Example Embodiment A1. A method by a user equipment for performing measurements during measurement gaps, the method comprising: any of the user equipment steps, features, or functions described above, either alone or in combination with other steps, features, or functions described above.

Example Embodiment A2. The method of the previous embodiment, further comprising one or more additional user equipment steps, features or functions described above.

Example Embodiment A3. The method of any of the previous embodiments, further comprising: providing user data; and forwarding the user data to a host computer via the transmission to the network node.

Group B Example Embodiments

Example Embodiment B1. A method performed by a network node, the method comprising: any of the network node steps, features, or functions described above, either alone or in combination with other steps, features, or functions described above.

Example Embodiment B2. The method of the previous embodiment, further comprising one or more additional network node steps, features or functions described above.

Example Embodiment B3. The method of any of the previous embodiments, further comprising: obtaining user data; and forwarding the user data to a host or a user equipment.

Group C Example Embodiments

Example Embodiment C1. A method by a user equipment (UE) for determining the validity of GNSS data, the method comprising: determining whether the GNSS data is valid or not valid based on a validity timer.

Example Embodiment C2. The method of Example Embodiment C1, further comprising: receiving the GNSS data; and in response to receiving the GNSS data, starting at least one validity timer.

Example Embodiment C3. The method of any one of Example Embodiment C1 to C2, wherein determining whether the GNSS is valid or not valid is based on whether the validity timer is expired.

Example Embodiment C4. The method of Example Embodiment C3, wherein the at least one validity timer comprises a plurality of validity timers, each one of the plurality of validity timers being associated with a use for the GNSS data.

Example Embodiment C5. The method of Example Embodiment C3, further comprising determining a use for the GNSS data, and wherein the GNSS data is determined to be valid or not valid based on a particular one of the plurality of validity timers that is associated with the use.

Example Embodiment C6. The method of Example Embodiment C5, wherein the use is associated with uplink synchronization.

Example Embodiment C7. The method of one of Example Embodiment C5, wherein the use is associated with a synchronization signal block measurement.

Example Embodiment C8. The method of Example Embodiment C5, wherein the use is associated with a cell selection procedure.

Example Embodiment C9. The method of any one of Example Embodiments C1 to C2, wherein determining whether the GNSS is valid or not valid is based on whether at least one timer-based condition being fulfilled.

Example Embodiment C10. The method of Example Embodiment C9, wherein the at least one timer-based condition comprises at least one threshold amount of time that the at least one validity timer has been running.

Example Embodiment C11. The method of Example Embodiment C9, wherein the GNSS is determined to be valid if the threshold amount of time has not been exceeded and the GNSS is determined to be invalid if the threshold amount of time has been exceeded.

Example Embodiment C12. The method of Example Embodiment C9, wherein the at least one timer-based condition comprises a plurality of threshold amounts of time that the at least one validity timer has been running, each of the plurality of threshold amounts of time being associated with a use for the GNSS data.

Example Embodiment C13. The method of Example Embodiment C12, further comprising determining a use for the GNSS data, and wherein the GNSS data is determined to be valid or not valid based on a particular one of the plurality of threshold amounts of time that is associated with the use has been exceeded.

Example Embodiment C14. The method of Example Embodiment C13, wherein the use is associated with uplink synchronization.

Example Embodiment C15. The method of one of Example Embodiment C13, wherein the use is associated with a synchronization signal block measurement.

Example Embodiment C16. The method of Example Embodiment C13, wherein the use is associated with a cell selection procedure.

Example Embodiment C17. The method of any one of Example Embodiments C1 to C16, further comprising receiving, from a network node, at least one parameter associated with the at least one validity timer.

Example embodiment C18. The method of any one of Example Embodiments C1 to C17, wherein the at least one validity timer comprises a GNSS validity timer and a time alignment timer.

Example Embodiment C19. The method of Example Embodiment 18, further comprising determining that the time alignment timer is expired based on at least one of: an expiration of the GNSS validity timer; an expiration of the GNSS validity timer by more than a threshold amount.

Example Embodiment C20. The method of any one of Example Embodiments C1 to C19, further comprising determining that the at least one validity timer has expired and refreshing the GNSS data.

Example Embodiment C21. The method of Example Embodiment C20, further comprising resetting or restarting the at least one validity timer when the GNSS data is refreshed.

Example Embodiment C22. The method of any one of Example Embodiments C1 to C21, wherein the at least one validity timer is associated with at least one of: UE position data; and Time reference information; and Frequency reference information.

Example Embodiment C23. The method of any one of Example Embodiments C1 to C22, further comprising determining, based on the at least one validity timer, whether the GNSS data will be valid during a connection duration by comparing the connection duration to an amount of time remaining on the at least one validity timer.

Example Embodiment C24. The method of any one of Example Embodiments C1 to C23, wherein upon determination that the at least one validity is expired, the method comprises at least one of: completing an uplink transmission and a downlink reception; completing a downlink reception but not an uplink transmission unless GNSS data is refreshed during a measurement and/or transmission gap; completing a downlink reception and transitioning to an RRC Idle state to initiate an uplink transmission; remaining in a RRC connected state, refraining from uplink transmissions while acquiring new GNSS data, and resuming uplink transmissions after new GNSS data is acquired.

Example Embodiment C25. The method of Example Embodiments C1 to C24, further comprising: providing user data; and forwarding the user data to a host via the transmission to the network node.

Example Embodiment C26. A user equipment comprising processing circuitry configured to perform any of the methods of Example Embodiments C1 to C25.

Example Embodiment C27. A wireless device comprising processing circuitry configured to perform any of the methods of Example Embodiments C1 to C25.

Example Embodiment C28. A computer program comprising instructions which when executed on a computer perform any of the methods of Example Embodiments C1 to C25.

Example Embodiment C29. A computer program product comprising computer program, the computer program comprising instructions which when executed on a computer perform any of the methods of Example Embodiments C1 to C25.

Example Embodiment C30. A non-transitory computer readable medium storing instructions which when executed by a computer perform any of the methods of Example Embodiments C1 to C25.

Group D Example Embodiments

Example Embodiment D1. A method by a network node for determining the validity of GNSS data, the method comprising: transmitting, to a wireless device, information associated with or for determining whether GNSS data is valid or not valid based on a validity timer.

Example Embodiment D2. The method of Example Embodiment D1, further comprising transmitting the GNSS data to the wireless device.

Example Embodiment D3. The method of any one of Example Embodiments D1 to D2, further comprising maintaining the at least one validity timer at the network node, and wherein transmitting the information comprises transmitting information indicating at least one of: whether the at least one validity timer is expired; and an amount of time associated with the at least one validity timer.

Example Embodiment D4. The method of any one of Example Embodiments D1 to D2, wherein the at least one validity timer is maintained at and/or by the wireless device, and wherein transmitting the information comprises transmitting information indicating at least one parameter associated with the at least one validity timer.

Example Embodiment D5. The method of any one of Example Embodiment D1 to D4, wherein determining whether the GNSS is valid or not valid is based on whether the validity timer is expired.

Example Embodiment D6. The method of Example Embodiment D5, wherein the at least one validity timer comprises a plurality of validity timers, each one of the plurality of validity timers being associated with a use for the GNSS data.

Example Embodiment D7. The method of Example Embodiment D6, further comprising determining a use for the GNSS data, and wherein the GNSS data is determined to be valid or not valid based on a particular one of the plurality of validity timers that is associated with the use.

Example Embodiment D8. The method of Example Embodiment D7, wherein the use is associated with uplink synchronization.

Example Embodiment D9. The method of one of Example Embodiment D7, wherein the use is associated with a synchronization signal block measurement.

Example Embodiment D10. The method of Example Embodiment D7, wherein the use is associated with a cell selection procedure.

Example Embodiment D11. The method of any one of Example Embodiments D1 to D4, wherein determining whether the GNSS is valid or not valid is based on whether at least one timer-based condition being fulfilled.

Example Embodiment D12. The method of Example Embodiment D11, wherein the at least one timer-based condition comprises at least one threshold amount of time that the at least one validity timer has been running.

Example Embodiment D13. The method of Example Embodiment D11, wherein the GNSS is determined to be valid if the threshold amount of time has not been exceeded and the GNSS is determined to be invalid if the threshold amount of time has been exceeded.

Example Embodiment D14. The method of Example Embodiment D11, wherein the at least one timer-based condition comprises a plurality of threshold amounts of time that the at least one validity timer has been running, each of the plurality of threshold amounts of time being associated with a use for the GNSS data.

Example Embodiment D15. The method of Example Embodiment D14, further comprising determining a use for the GNSS data, and wherein the GNSS data is determined to be valid or not valid based on a particular one of the plurality of threshold amounts of time that is associated with the use has been exceeded.

Example Embodiment D16. The method of Example Embodiment D15, wherein the use is associated with uplink synchronization.

Example Embodiment D17. The method of one of Example Embodiment D15, wherein the use is associated with a synchronization signal block measurement.

Example Embodiment D18. The method of Example Embodiment D15, wherein the use is associated with a cell selection procedure.

Example embodiment D19. The method of any one of Example Embodiments D1 to D18, wherein the at least one validity timer comprises a GNSS validity timer and a time alignment timer.

Example Embodiment D20. The method of Example Embodiment D19, further comprising determining that the time alignment timer is expired based on at least one of: an expiration of the GNSS validity timer; and an expiration of the GNSS validity timer by more than a threshold amount.

Example Embodiment D21. The method of any one of Example Embodiments D1 to D20, further comprising determining that the at least one validity timer has expired and refreshing the GNSS data.

Example Embodiment D22. The method of Example Embodiment D21, further comprising resetting or restarting the at least one validity timer when the GNSS data is refreshed.

Example Embodiment D23. The method of any one of Example Embodiments D1 to D22, wherein the at least one validity timer is associated with at least one of: UE position data; and Time reference information; and Frequency reference information.

Example Embodiment D24. The method of any one of Example Embodiments D1 to D23, further comprising determining, based on the at least one validity timer, whether the GNSS data will be valid during a connection duration by comparing the connection duration to an amount of time remaining on the at least one validity timer.

Example Embodiment D25. The method of any one of Example Embodiments D1 to D24, further comprising obtaining information indicating a remaining time before the at least one validity timer expires and performing at least one of: determining if the at least one validity timer will expire during an ongoing connection of the wireless device; transmit information to the wireless device indicating that the at least one validity timer will expire during an ongoing connection of the wireless device; request the wireless device to refresh the GNSS data immediately; request the wireless device to refresh the GNSS data within a given time period; modify a measurement gap configuration for the wireless device; delaying a timing out of a connection; and delaying a declaration of a radio link failure.

Example Embodiment D26. The method of Example Embodiments D1 to D25, further comprising: providing user data; and forwarding the user data to a host via the transmission to the network node.

Example Embodiment D27. A user equipment comprising processing circuitry configured to perform any of the methods of Example Embodiments D1 to D26.

Example Embodiment D28. A wireless device comprising processing circuitry configured to perform any of the methods of Example Embodiments D1 to D26.

Example Embodiment D29. A computer program comprising instructions which when executed on a computer perform any of the methods of Example Embodiments D1 to D26.

Example Embodiment D30. A computer program product comprising computer program, the computer program comprising instructions which when executed on a computer perform any of the methods of Example Embodiments D1 to D26.

Example Embodiment D31. A non-transitory computer readable medium storing instructions which when executed by a computer perform any of the methods of Example Embodiments D1 to D26.

Group E Example Embodiments

Example Embodiment E1. A user equipment comprising: processing circuitry configured to perform any of the steps of any of the Group A and C Example Embodiments; and power supply circuitry configured to supply power to the processing circuitry.

Example Embodiment E2. A network node comprising: processing circuitry configured to perform any of the steps of any of the Group B and D Example Embodiments; power supply circuitry configured to supply power to the processing circuitry.

Example Embodiment E3. A user equipment (UE) comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A and C Example Embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment E4. A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A and C Example Embodiments to receive the user data from the host.

Example Embodiment E5. The host of the previous Example Embodiment, wherein the cellular network further includes a network node configured to communicate with the UE to transmit the user data to the UE from the host.

Example Embodiment E6. The host of the previous 2 Example Embodiments, wherein: the processing circuitry of the host is configured to execute a host application, thereby providing the user data; and the host application is configured to interact with a client application executing on the UE, the client application being associated with the host application.

Example Embodiment E7. A method implemented by a host operating in a communication system that further includes a network node and a user equipment (UE), the method comprising: providing user data for the UE; and initiating a transmission carrying the user data to the UE via a cellular network comprising the network node, wherein the UE performs any of the operations of any of the Group A embodiments to receive the user data from the host.

Example Embodiment E8. The method of the previous Example Embodiment, further comprising: at the host, executing a host application associated with a client application executing on the UE to receive the user data from the UE.

Example Embodiment E9. The method of the previous Example Embodiment, further comprising: at the host, transmitting input data to the client application executing on the UE, the input data being provided by executing the host application, wherein the user data is provided by the client application in response to the input data from the host application.

Example Embodiment E10. A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A and C Example Embodiments to transmit the user data to the host.

Example Embodiment E11. The host of the previous Example Embodiment, wherein the cellular network further includes a network node configured to communicate with the UE to transmit the user data from the UE to the host.

Example Embodiment E12. The host of the previous 2 Example Embodiments, wherein: the processing circuitry of the host is configured to execute a host application, thereby providing the user data; and the host application is configured to interact with a client application executing on the UE, the client application being associated with the host application.

Example Embodiment E13. A method implemented by a host configured to operate in a communication system that further includes a network node and a user equipment (UE), the method comprising: at the host, receiving user data transmitted to the host via the network node by the UE, wherein the UE performs any of the steps of any of the Group A and C Example Embodiments to transmit the user data to the host.

Example Embodiment E14. The method of the previous Example Embodiment, further comprising: at the host, executing a host application associated with a client application executing on the UE to receive the user data from the UE.

Example Embodiment E15. The method of the previous Example Embodiment, further comprising: at the host, transmitting input data to the client application executing on the UE, the input data being provided by executing the host application, wherein the user data is provided by the client application in response to the input data from the host application.

Example Embodiment E16. A host configured to operate in a communication system to provide an over-the-top (OTT) service, the host comprising: processing circuitry configured to provide user data; and a network interface configured to initiate transmission of the user data to a network node in a cellular network for transmission to a user equipment (UE), the network node having a communication interface and processing circuitry, the processing circuitry of the network node configured to perform any of the operations of any of the Group B and D Example Embodiments to transmit the user data from the host to the UE.

Example Embodiment E17. The host of the previous Example Embodiment, wherein: the processing circuitry of the host is configured to execute a host application that provides the user data; and the UE comprises processing circuitry configured to execute a client application associated with the host application to receive the transmission of user data from the host.

Example Embodiment E18. A method implemented in a host configured to operate in a communication system that further includes a network node and a user equipment (UE), the method comprising: providing user data for the UE; and initiating a transmission carrying the user data to the UE via a cellular network comprising the network node, wherein the network node performs any of the operations of any of the Group B and D Example Embodiments to transmit the user data from the host to the UE.

Example Embodiment E19. The method of the previous Example Embodiment, further comprising, at the network node, transmitting the user data provided by the host for the UE.

Example Embodiment E20. The method of any of the previous 2 Example Embodiments, wherein the user data is provided at the host by executing a host application that interacts with a client application executing on the UE, the client application being associated with the host application.

Example Embodiment E21. A communication system configured to provide an over-the-top service, the communication system comprising: a host comprising: processing circuitry configured to provide user data for a user equipment (UE), the user data being associated with the over-the-top service; and a network interface configured to initiate transmission of the user data toward a cellular network node for transmission to the UE, the network node having a communication interface and processing circuitry, the processing circuitry of the network node configured to perform any of the operations of any of the Group B and D Example Embodiments to transmit the user data from the host to the UE.

Example Embodiment E22. The communication system of the previous Example Embodiment, further comprising: the network node; and/or the user equipment.

Example Embodiment E23. A host configured to operate in a communication system to provide an over-the-top (OTT) service, the host comprising: processing circuitry configured to initiate receipt of user data; and a network interface configured to receive the user data from a network node in a cellular network, the network node having a communication interface and processing circuitry, the processing circuitry of the network node configured to perform any of the operations of any of the Group B and D Example Embodiments to receive the user data from a user equipment (UE) for the host.

Example Embodiment E24. The host of the previous 2 Example Embodiments, wherein: the processing circuitry of the host is configured to execute a host application, thereby providing the user data; and the host application is configured to interact with a client application executing on the UE, the client application being associated with the host application.

Example Embodiment E25. The host of the any of the previous 2 Example Embodiments, wherein the initiating receipt of the user data comprises requesting the user data.

Example Embodiment E26. A method implemented by a host configured to operate in a communication system that further includes a network node and a user equipment (UE), the method comprising: at the host, initiating receipt of user data from the UE, the user data originating from a transmission which the network node has received from the UE, wherein the network node performs any of the steps of any of the Group B and D Example Embodiments to receive the user data from the UE for the host.

Example Embodiment E27. The method of the previous Example Embodiment, further comprising at the network node, transmitting the received user data to the host.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The invention claimed is:

1. A method by a user equipment (UE), the method comprising:

obtaining Global Navigation Satellite System (GNSS) data;

during establishment of a connection with a network, transmitting, to the network, an indication of a validity duration of the GNSS data; and receiving, from the network, an indication that the GNSS data is not expected to remain valid during the connection.

2. The method of claim 1, further comprising:

after receiving the indication that the GNSS data is not expected to remain valid during the connection, acquiring new GNSS data.

3. The method of claim 1, wherein the network requests the UE to refresh the GNSS data.

4. The method of claim 1, wherein the network is a Non-Terrestrial Network (NTN).

5. The method of claim 1, further comprising:

maintaining at least one validity timer for determining whether the GNSS data is valid or not valid.

6. A user equipment (UE) comprising processing circuitry configured to cause the UE to:

obtain Global Navigation Satellite System (GNSS) data;

during establishment of a connection with a network, transmit, to the network, an indication of a validity duration of the GNSS data; and receive, from the network, an indication that the GNSS data is not expected to remain valid during the connection.

7. The UE of claim 6, wherein the processing circuitry is configured to cause the UE to:

after receiving the indication that the GNSS data is not expected to remain valid during the connection, acquire new GNSS data.

8. The UE of claim 6, wherein the network requests the UE to refresh the GNSS data.

9. The UE of claim 6, wherein the network is a Non-Terrestrial Network (NTN).

10. The UE of claim 6, wherein the processing circuitry is configured to cause the UE to:

maintain at least one validity timer for determining whether the GNSS data is valid or not valid.

11. A method by a network node, the method comprising:

during establishment of a connection with a user equipment (UE), receiving, from the UE, an indication of a validity duration of Global Navigation Satellite System (GNSS) data; and transmitting, to the UE, an indication that the GNSS data is not expected to remain valid during the connection.

12. The method of claim 11, wherein the network node requests the UE to refresh the GNSS data.

13. The method of claim 11, wherein the network node is part of a Non-Terrestrial Network (NTN).

14. The method of claim 11, further comprising:

maintaining, at the network node, at least one validity timer for determining whether the GNSS data is valid or not valid.

15. A network node comprising processing circuitry configured to cause the network node to:

during establishment of a connection with a user equipment (UE), receive, from the UE, an indication of a validity duration of Global Navigation Satellite System (GNSS) data; and transmit, to the UE, an indication that the GNSS data is not expected to remain valid during the connection.

16. The network node of claim 15, wherein the network node requests the UE to refresh the GNSS data.

17. The network node of claim 15, wherein the network is part of a Non-Terrestrial Network (NTN).

18. The network node of claim 15, wherein the processing circuitry is configured to cause the network node to:

maintain, at the network node, at least one validity timer for determining whether the GNSS data is valid or not valid.

* * * * *